(12) United States Patent
Yamasaki et al.

(10) Patent No.: US 7,647,497 B2
(45) Date of Patent: Jan. 12, 2010

(54) METHOD AND PROGRAM FOR USER AUTHENTICATION IN A NETWORK STORAGE SYSTEM

(75) Inventors: Yasuo Yamasaki, Kodaira (JP); Akihiko Sakaguchi, Tachikawa (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 10/864,647

(22) Filed: Jun. 10, 2004

(65) Prior Publication Data

US 2005/0204147 A1    Sep. 15, 2005

(30) Foreign Application Priority Data

Mar. 12, 2004    (JP)    ............................... 2004-070795

(51) Int. Cl.
H04L 29/06    (2006.01)
(52) U.S. Cl. ........................... 713/165; 726/26; 726/27; 726/28
(58) Field of Classification Search ........................ None
See application file for complete search history.

(56) References Cited

U.S. PATENT DOCUMENTS

| | | | |
|---|---|---|---|
| 5,881,225 A | 3/1999 | Worth | |
| 6,564,247 B1 | 5/2003 | Todorov | |
| 6,920,482 B1* | 7/2005 | Fujiyoshi | 709/206 |
| 7,069,380 B2* | 6/2006 | Ogawa et al. | 711/112 |
| 2002/0145625 A1 | 10/2002 | Komine et al. | |

OTHER PUBLICATIONS

IEEE Draft P1003.1e, Draft Standard for Information Technology—Portable Operating System Interface [POSIX]—Part 1: System Application Program Interface (API)—Amendment #: Protection, Audit and Control Interface [C Language], Oct. 1997. USA.

* cited by examiner

Primary Examiner—Jung Kim
(74) Attorney, Agent, or Firm—Brundidge & Stanger, P.C.

(57) ABSTRACT

Provided is a storage system for solving the problem in that, when the registration of a nonexistent user is deleted, only a system administrator can access files that the user left, so that a load placed on the administrator increases at the time of an audit. The authentication program for permitting a user, who is attempting to log in to a storage system, to access a file recorded in the storage system, the program including: a first step for receiving a user name and a password from the user; a second step for referring to a validity term corresponding to a pair of the user name and the password recorded in the storage system; and a third step for permitting access by the user to a file corresponding to the validity term based on a result of the second step, the first to third steps being executed by a processor.

14 Claims, 24 Drawing Sheets

FIG.5

LOG-IN MANAGEMENT TABLE

| IP ADDRESS | USER NAME | FILE SYSTEM NUMBER |
|---|---|---|
| 10.0.0.101 | "yamasaki" | 1 |
| 10.0.0.115 | "tanaka" | 1 |
| 10.0.0.88 | "Yamasaki" | 2 |
| | | |
| ⋮ | ⋮ | ⋮ |

FILE SYSTEM MANAGEMENT TABLE

| FILE SYSTEM NUMBER | SNAPSHOT TIME |
|---|---|
| 1 | "CURRENT" |
| 2 | 1995/06/01 12:00:00 |
| 3 | "EMPTY" |

PASSWORD MANAGEMENT TABLE

| ENTRY NUMBER | USER NAME | PASSWORD | VALIDITY TERM START TIME | VALIDITY TERM END TIME |
|---|---|---|---|---|
| 0 | "root" | "admin2004" | 1960/01/01 00:00:00 | "CURRENT" |
| 1 | "Yamasaki" | "Quit692" | 1970/04/01 00:00:00 | 1979/03/31 23:59:59 |
| 2 | "Yamasaki" | "j6X3Cd" | 1990/04/01 00:00:00 | "CURRENT" |
| 3 | "tanaka" | "tss34" | 1995/04/01 00:00:00 | "CURRENT" |
| 4 | "" | | | |
| ⋮ | ⋮ | ⋮ | ⋮ | ⋮ |

LOG-IN MANAGEMENT TABLE

| IP ADDRESS | USER NAME | VALIDITY TERM START TIME | VALIDITY TERM END TIME |
|---|---|---|---|
| 10.0.0.101 | "Yamasaki" | 1990/04/01 00:00:00 | "CURRENT" |
| 10.0.0.115 | "tanaka" | 1995/04/01 00:00:00 | "CURRENT" |
| 10.0.0.88 | "Yamasaki" | 1970/04/01 00:00:00 | 1979/03/31 23:59:59 |
|  |  |  |  |
| . . . | . . . | . . . | . . . |

501   502   2201   2202

1906

METHOD AND PROGRAM FOR USER AUTHENTICATION IN A NETWORK STORAGE SYSTEM

CLAIM OF PRIORITY

The present application claims priority from Japanese application JP 2004-070795 filed on Mar. 12, 2004, the content of which is hereby incorporated by reference into this application.

BACKGROUND

The present invention relates to a user authentication technique in a storage system connected to a network.

As a result of recent developments in a network technique and an information recording technique, a so-called network storage system has appeared in which a mass storage system is connected to a network and is shared by many users. In such a storage system shared by many users, in order to prevent the leakage of secret information and the unauthorized alteration of data, an authentication technique is required with which it is judged whether a user who is attempting to access data has an access right. Therefore, a user authentication technique based on a combination of a user name and a password is widely used (see IEEE Draft P1003.1e, Draft Standard for Information Technology—Portable Operating System Interface (POSIX)—Part 1: System Application Program Interface (API)—Amendment#: Protection, Audit and Control Interface [C Language], October 1997).

With this authentication technique, when attempting to log in to a network storage system, a user inputs his/her user name and password and, if the inputted user name and password match any one of registered pairs of user names and passwords, he/she is judged as an authorized user and is permitted to access a file owned by himself/herself in the system.

In the practical use of such an authentication technique, there may be a case where a user no longer needs to access a network storage system due to retirement or the like. In such a case, an administrator of the system deletes the registration of his/her user name and password in ordinary cases. At this time, files owned by the user may be owned by another user by changing the owner of the files. However, there also exist files, such as an e-mail archive, that are inappropriate for the owner changing and such files are set accessible only by the administrator after the deletion of the registration of the user name and password.

Under the recent regulations by law and the like, the long-term storage of data is obligated and it is expected that an opportunity to access old data for the sake of an audit or the like will increase. There is a case where such old data includes data owned by a user who is now nonexistent due to retirement or the like. If the user name and password of the nonexistent user are deleted, it becomes impossible for a person other than the administrator to access files owned by the user. Therefore, each time an audit or the like is conducted, there arises the necessity for the administrator to access such data. If the number of audits or the number of files to be accessed is large, a load placed on the administrator increases and the practical use becomes difficult in actuality.

There is another possible case where the user name and password of the nonexistent user are not deleted and another user (superior of the nonexistent user, for instance) is delegated to access the files owned by the nonexistent user. In this case, however, the registration of the user name of the nonexistent user remains, so that it becomes impossible to newly register another user using the same user name. Therefore, when the user name and password are not deleted, the range of selection of user names is gradually narrowed and convenience decreases.

SUMMARY

According to the present invention, there is provided an authentication program for permitting a user, who is attempting to log in to a storage system, to access a file recorded in the storage system, the program including: a first step for receiving a user name and a password from the user; a second step for referring to a validity term corresponding to a pair of the user name and the password recorded in the storage system; and a third step for permitting access by the user to a file corresponding to the validity term based on a result of the second step, the first to third steps being executed by a processor.

According to the present invention, the registration of the user name and password of a nonexistent user is not deleted, thereby making it possible to delegate the access to a file owned by the nonexistent user to another user other than an administrator with ease.

Also, a validity term is set for each pair of a user name and a password and it is possible to register the same user name for different users unless there is an overlap between their validity terms, thereby enhancing convenience.

BRIEF DESCRIPTION OF THE DRAWINGS

FIG. 5 is an explanatory diagram of a log-in management table according to the first embodiment of the present invention.

FIG. 6 is an explanatory diagram of a file system management table according to the first embodiment of the present invention.

FIG. 7 is an explanatory diagram of a password management table according to the first embodiment of the present invention.

FIG. 22 is an explanatory diagram of a log-in management table according to the second embodiment of the present invention.

DESCRIPTION OF THE PREFERRED EMBODIMENTS

Embodiments of the present invention will now be described with reference to the accompanying drawings.

Figure 1:
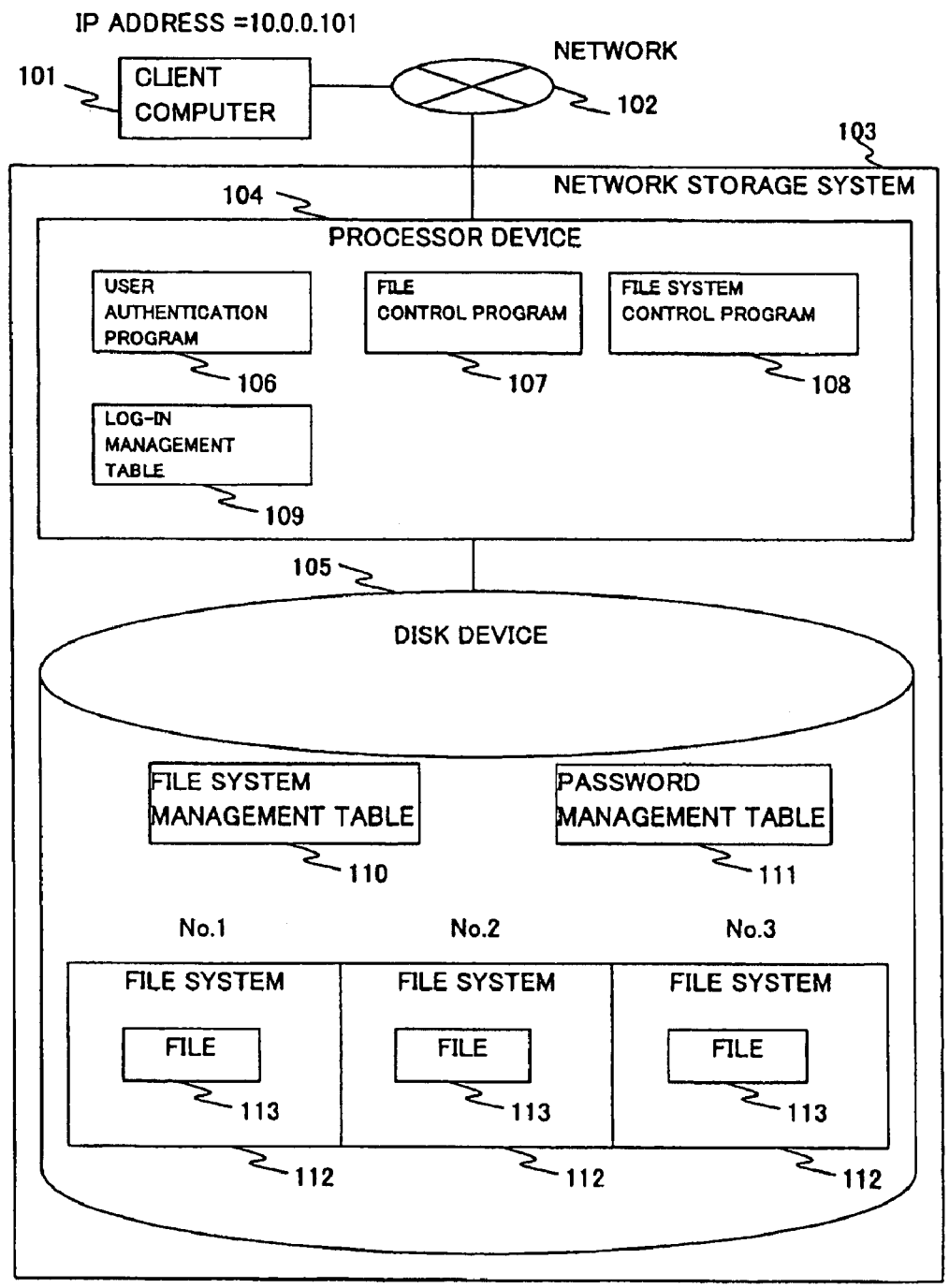
FIG. 1 is a block diagram of a computer system according to a first embodiment of the present invention.

FIG. 1 is a block diagram of a network storage system according to a first embodiment of the present invention.

A network storage system 103 is communicably connected to a client computer 101 through a network 102.

The network storage system 103 includes a processor device 104 and a disk device 105, and performs data writing/reading according to each request from the client computer 101.

The processor device 104 includes a CPU (not shown), a memory (not shown), an interface (not shown), and the like, processes each data writing/reading request from the client computer 101, and manages data to be recorded on the disk device 105. On the memory (not shown) of the processor device 104, a user authentication program 106, a file control program 107, a file system control program 108, and a log-in management table 109 are recorded. Of those, each program is executed by the CPU (not shown) of the processor device 104.

The disk device 105 is, for instance, a magnetic disk device and may be a single disk drive or a disk array composed of multiple disk drives. In the disk device 105, a file system management table 110, a password management table 111, and one or more file systems 112 are recorded.

In the example illustrated in FIG. 1, three file systems 112 having numbers from "1" to "3" are recorded. For instance, the file system 112 having the number "1" is a file system 112 that is currently used and the file systems 112 having the numbers "2" and "3" are each a snapshot of the file system "1".

Here, the snapshot means a duplication of the file system 112 created at a certain point in time and is created by a file system duplication routine 401 to be described later.

Each file system 112 may contain one or more files 113. Each file 113 is a file recorded in response to a writing request from the client computer 101.

Figure 2:
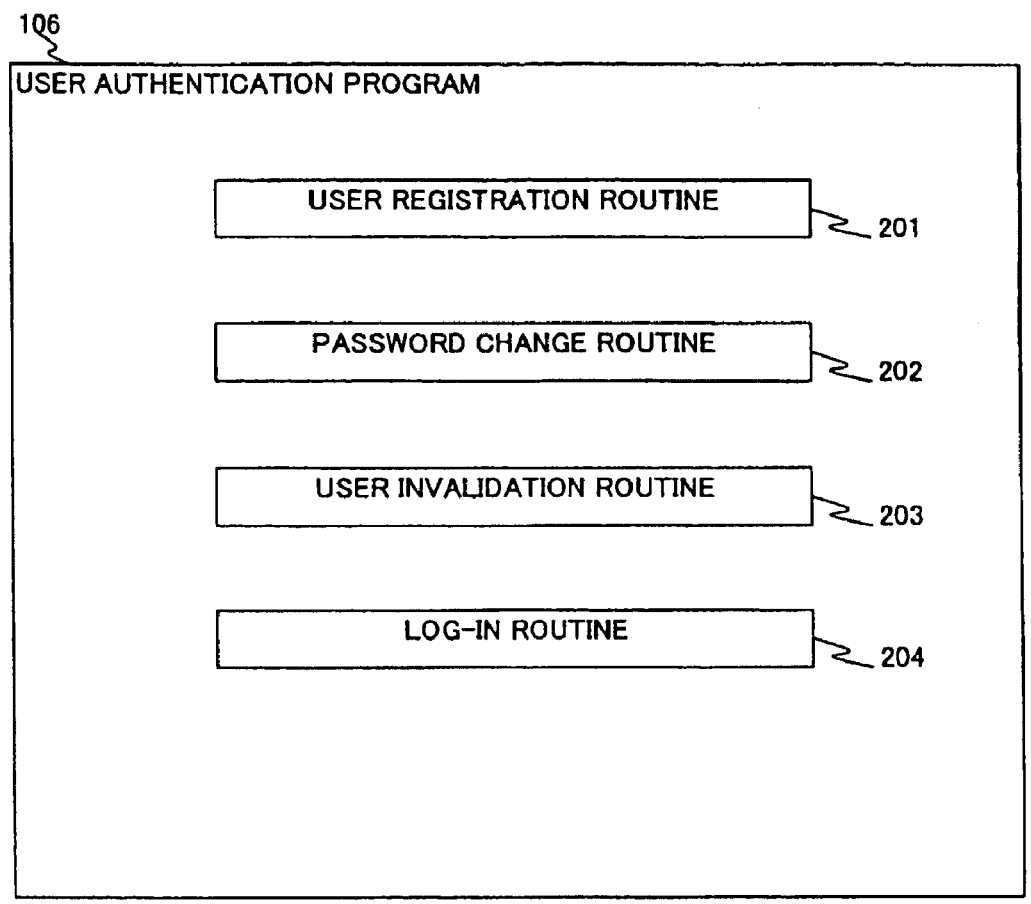
FIG. 2 is an explanatory diagram of a configuration of a user authentication program according to the first embodiment of the present invention.

FIG. 2 is an explanatory diagram of a configuration of the user authentication program 106 according to the first embodiment of the present invention.

The user authentication program 106 is composed of a user registration routine 201, a password change routine 202, a user invalidation routine 203, and a log-in routine 204. These routines will be described in detail with reference to FIGS. 9 to 12, respectively.

Figure 3:
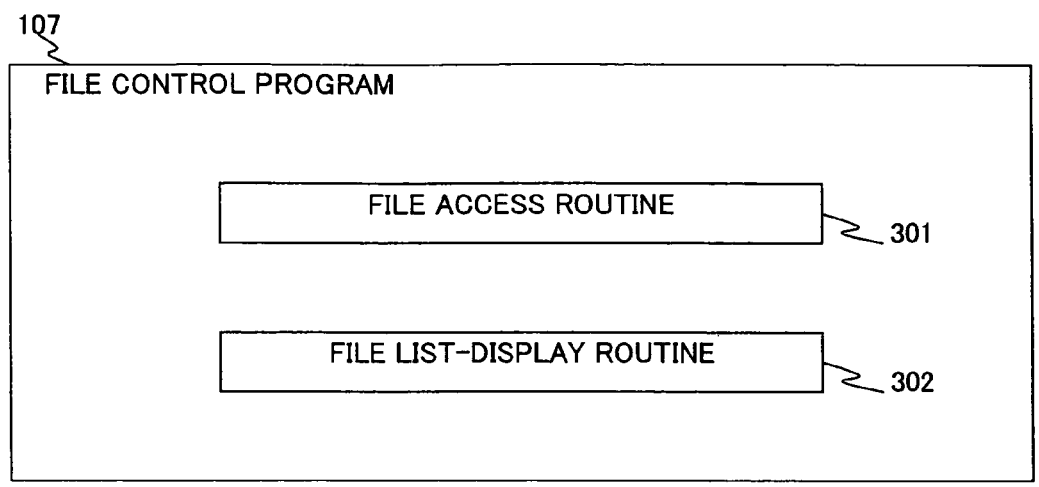
FIG. 3 is an explanatory diagram of a configuration of a file control program according to the first embodiment of the present invention.

FIG. 3 is an explanatory diagram of a configuration of the file control program 107 according to the first embodiment of the present invention.

The file control program 107 is composed of a file access routine 301 and a file list-display routine 302. Of those, the file access routine 301 will be described in detail with reference to FIG. 13.

The file list-display routine 302 is a subroutine for providing a user, who has logged in to the network storage system 103, with a list-display of each file 113 contained in a file system 112 where the user is accessing, and is called from the client computer 101.

Figure 4:
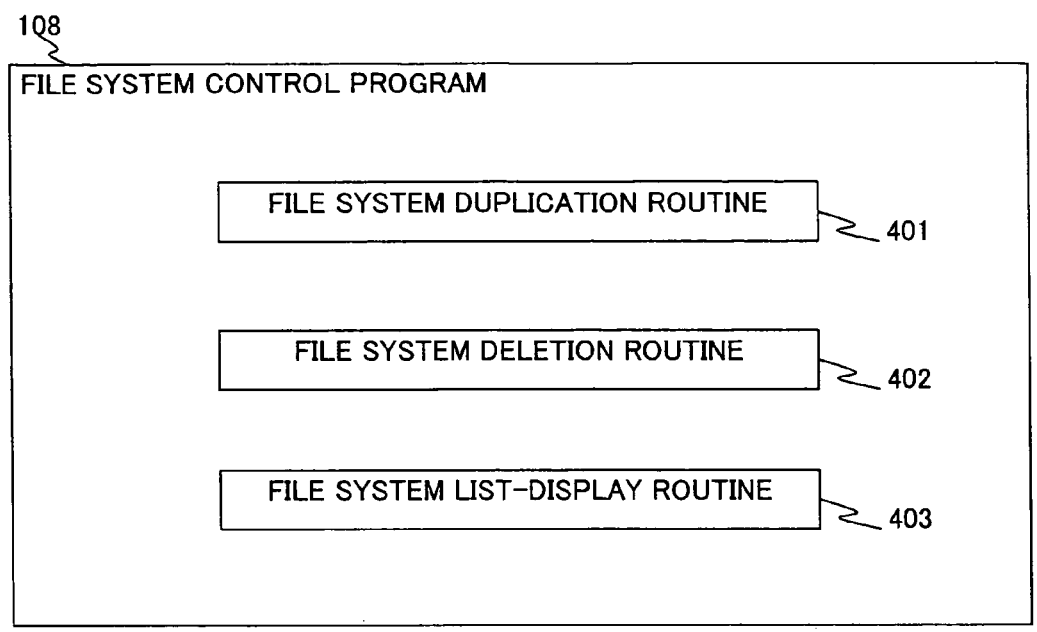
FIG. 4 is an explanatory diagram of a configuration of a file system control program according to the first embodiment of the present invention.

FIG. 4 is an explanatory diagram of a configuration of the file system control program 108 according to the first embodiment of the present invention.

The file system control program 108 is composed of a file system duplication routine 401, a file system deletion routine 402, and a file system list-display routine 403. These routines will be described in detail with reference to FIGS. 14 to 16, respectively.

FIG. 5 is an explanatory diagram of a log-in management table 109 according to the first embodiment of the present invention.

The log-in management table 109 is a table in which correspondences between users that have logged in to the network storage system 103 and the file systems 112 that the users can access are registered. The log-in management table 109 is updated by the log-in routine 204 and is referred to by the file access routine 301.

In the log-in management table 109, information is registered on an entry basis. Each entry is composed of an IP address 501 as well as a user name 502 and a file system number 503 corresponding to the IP address 501.

Each IP address 501 is the IP address of one of client computers 101 that have logged in to the network storage system 103.

Each user name 502 is the name of a user using a client computer 101 having its corresponding IP address 501. It should be noted that the user name 502 is a user name registered by an administrator of the network storage system 103 through execution of the user registration routine 201.

Each file system number 503 is the number of a file system 112 accessible by a user of a client computer having its corresponding IP address 501 and is a number uniquely assigned to the file system 112 in the disk device 105.

In the example illustrated in FIG. 5, the user names 502 in the first entry and the third entry are both set at the same name "yamasaki", but their corresponding file system numbers 503 are set at different numbers. That is, the file system number 503 in the first entry is set at "1" and the file system number 503 in the third entry is set at "2". This means that a person having the user name "yamasaki" in the third entry is different from a person having the user name "yamasaki" in the first entry and is a user who was existent in the past but is not existent at present. Therefore, with the user name "yamasaki" in the third entry, it is possible to access only the snapshot (file system "2") created in the past and it is impossible to access the current file system (file system "1").

FIG. 6 is an explanatory diagram of the file system management table 110 according to the first embodiment of the present invention.

The file system management table 110 records the attribute of each file system 112 recorded in the disk device 105, is referred to by the log-in routine 204, and is updated by the file system duplication routine 401.

In the file system management table 110, information is registered on an entry basis. Each entry is composed of a file system number 601 and a snapshot time 602 corresponding to the file system number 601.

Each file system number 601 is a number uniquely assigned in order to identify one of the file systems 112 recorded in the disk device 105.

Each snapshot time 602 is a time at which a file system 112 having its corresponding file system number 601 was created. In more detail, when the file system 112 is a snapshot, the value of the snapshot time 602 is set at a time at which the snapshot was created. Also, when the file system 112 is a file system that is currently used, the value of the snapshot time 602 is set at "CURRENT". Further, when the file system 112 is not yet created, the value of the snapshot time 602 is set at "EMPTY".

In the example illustrated in FIG. 6, the file system "1" is currently used, the file system "2" is a snapshot of the file system "1" created at "1995/06/01 12:00:00", and the file system "3" is not yet created at the current point in time.

FIG. 7 is an explanatory diagram of the password management table 111 according to the first embodiment of the present invention.

The password management table 111 is a table, with which the user account information, such as the password, of each user who can log in to the network storage system 103 is managed. The table 111 is updated by the user registration routine 201, the password change routine 202, and the user invalidation routine 203, and is referred to by the user registration routine 201, the password change routine 202, the user invalidation routine 203, the log-in routine 204, the file system duplication routine 401, and the file system deletion routine 402.

In the password management table 111, information is registered on an entry basis. Each entry is composed of an entry number 701, a user name 702, a password 703, a validity term start time 704, and a validity term end time 705.

Each entry number 701 is a number uniquely assigned in order to identify one of the entries.

Each user name 702 is the name of one of users, who are capable of logging in to the network storage system 103, and is given by the administrator. (see FIG. 9). It should be noted that the user name 702 of the administrator is "root".

Each password 703 is a password used by one of the users at the time of log-in to the network storage system 103. Unless the user inputs his/her password 703 registered in the password management table 111, he/she cannot log in to the network storage system 103. The value of the password 703 is initially given by the administrator (see FIG. 9) and is capable of being changed by the user himself/herself afterward (see FIG. 10).

Each validity term start time 704 is a time, at which an entry containing this validity term start time 704 was registered (see FIG. 9), and corresponds to the start of a term in which a user corresponding to the entry can log in to the network storage system 103.

Each validity term end time 705 is a time at which a user corresponding to an entry containing this validity term end time 705 was invalidated.

Here, the user invalidation means processing performed by the administrator in order to limit the access right to the network storage system 103 of a user who will not access the network storage system 103 any more due to his/her retirement or the like.

There is a case where even after limiting the access right of a certain user to the network storage system 103 due to the retirement or the like, there arises a necessity for another user to access a file 113 created by the certain user. Therefore, in the present invention, the certain user teaches his/her password 703 to the other user (such as his/her superior) and hands over his/her access right. After the handing over of the access right, the other user may change the password 703 to a value unknown by the original user through execution of the password change routine 202. In this case, the original user becomes incapable of accessing his/her file 113.

The administrator does not delete an entry corresponding to the original user and records a date and time, at which the access right was handed over, in the validity term end time 705 in the entry. This processing is referred to as the "user invalidation" in this specification (see FIG. 11).

Figure 12:
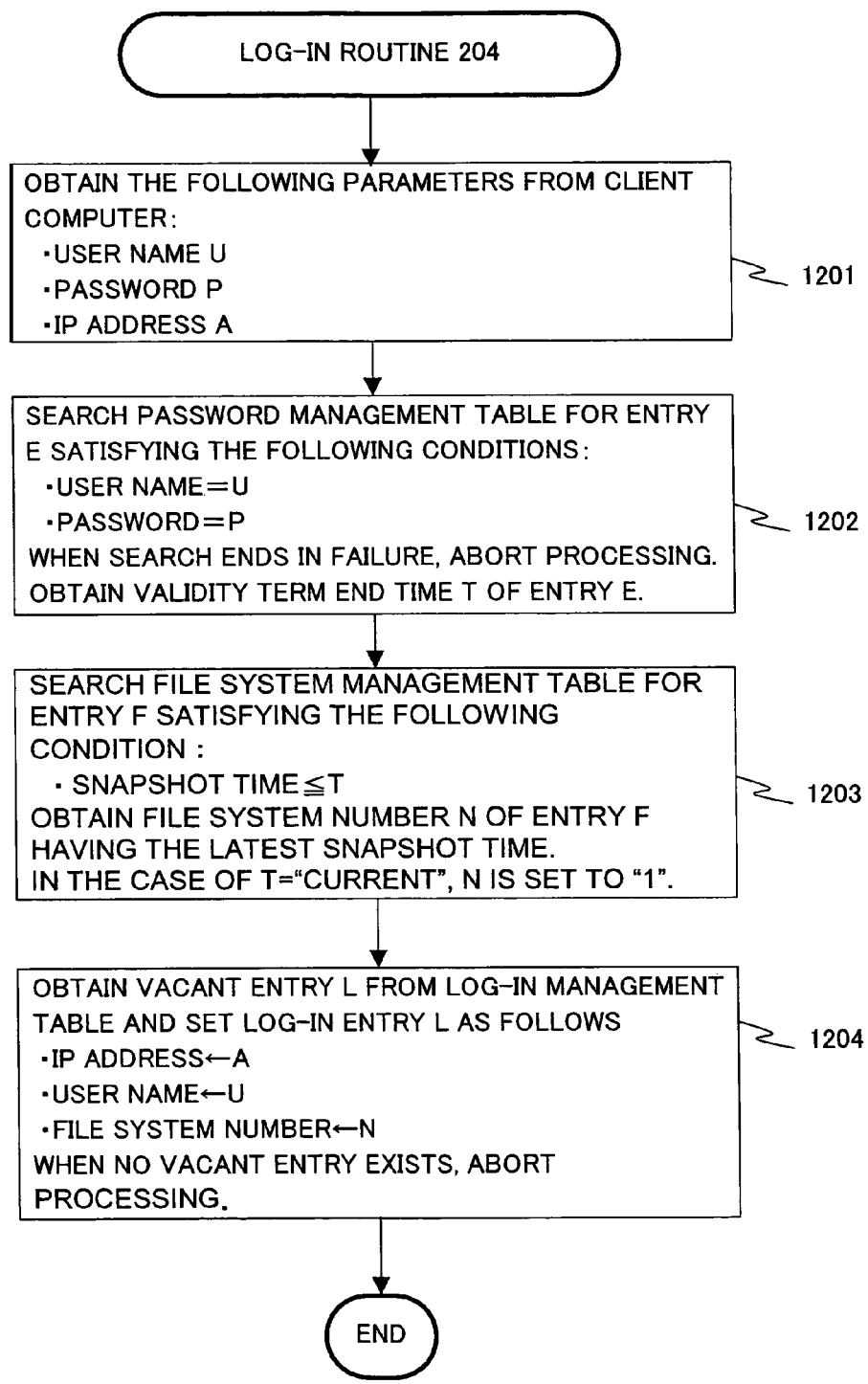
FIG. 12 is a flowchart of a log-in routine according to the first embodiment of the present invention.

The user, who has taken over the access right, can log in to the network storage system 103 using the user name 702 and the password 703 of the original user, but the file system 112 accessible by the user is limited to a file system (snapshot) created when the original user was enrolled (see FIG. 12). That is, so long as the user, who has taken over the access right, has logged in using the user name 702 and the password 703 of the original user, he/she cannot access a file system 112 (snapshot) created after the invalidation of the original user.

On the other hand, the value of the validity term end time 705 of each user, who is not invalidated, is set at "CURRENT". Accordingly, each user corresponding to a validity term end time 705 set at the value "CURRENT" can access the current file system 112.

In the example illustrated in FIG. 7, a user corresponding to the entry number 701 set at "0" is the administrator, so that his/her user name 702 is "root".

Also, the user names 702 corresponding to the entry numbers 701 set at "1" and "2" are both set at "yamasaki" but have different passwords 703. Also, the validity term end time 705 in the entry, in which the entry number is "1" and the user name is "yamasaki", is set at "Mar. 31, 1979 23:59:59" and the validity term end time 705 in the entry, in which the entry number is "2" and the user name is "yamasaki", is "CURRENT". That is, the person having the user name "yamasaki" in the entry having the entry number "1" is a user invalidated due to his/her retirement or the like and is now nonexistent, while the person having the user name "yamasaki" in the entry having the entry number "2" is a user who is now existent. The validity terms in the entries having the user name "yamasaki" do not overlap each other, so that the users corresponding to these entries are capable of using the same user name 702.

Figure 8:
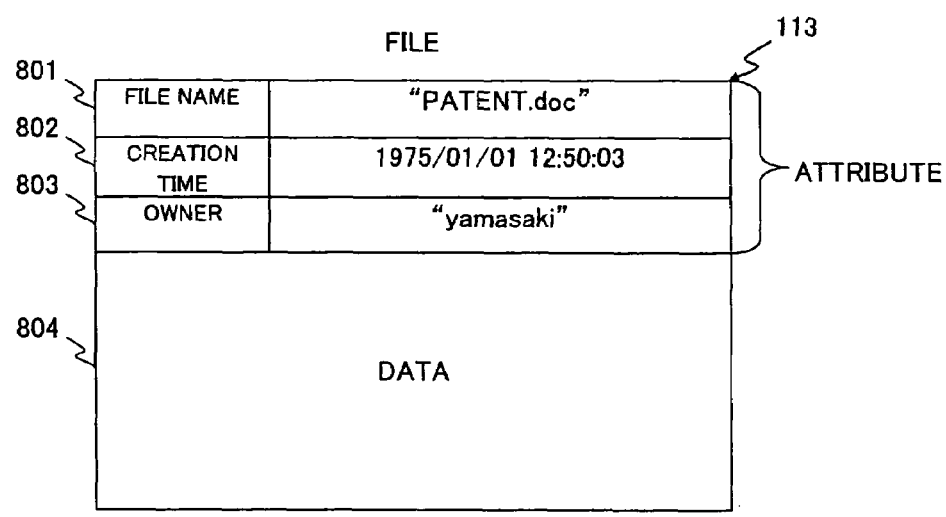
FIG. 8 is an explanatory diagram of a file according to the first embodiment of the present invention.

FIG. 8 is an explanatory diagram of a file 113 according to the first embodiment of the present invention.

The file 113 is composed of attribute information, which gives a file name 801, a creation time 802, and an owner 803, and data 804.

The file name 801 indicates the name of the file 113.

The creation time 802 indicates a time at which the file 113 was created.

The owner 803 indicates the user name 702 of the owner of the file 113. Here, the owner may be a person requesting the writing of the file 113, a person having an access right to the file 113, or a person creating or changing the data 804 in the file 113.

The data 804 is the main body of data whose writing was requested from the client computer 101. For instance, when the file 113 is a document file, the data 804 is document data.

Figure 9:
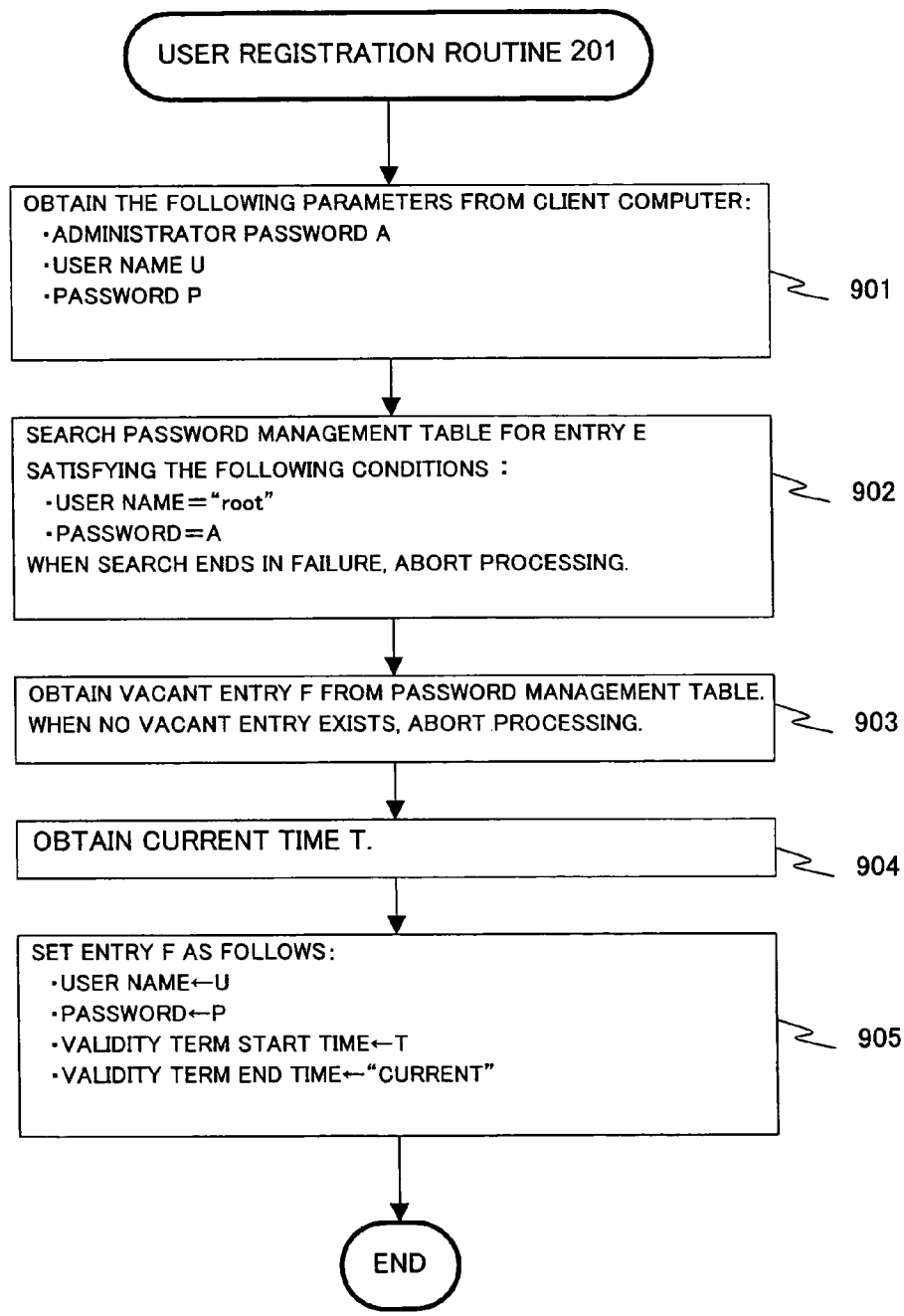
FIG. 9 is a flowchart of a user registration routine according to the first embodiment of the present invention.

FIG. 9 is a flowchart of the user registration routine 201 according to the first embodiment of the present invention.

The user registration routine 201 is a subroutine in which the administrator newly registers a user who can log in to the network storage system 103, and is called from a client computer 101.

When called from the client computer 101, the user registration routine 201 obtains an administrator password A, a user name U, and a password P from the client computer 101 (901). Here, the user name U represents a user that the administrator is attempting to register and the password P is the initial value of a password to be used by the user.

Figure 17:
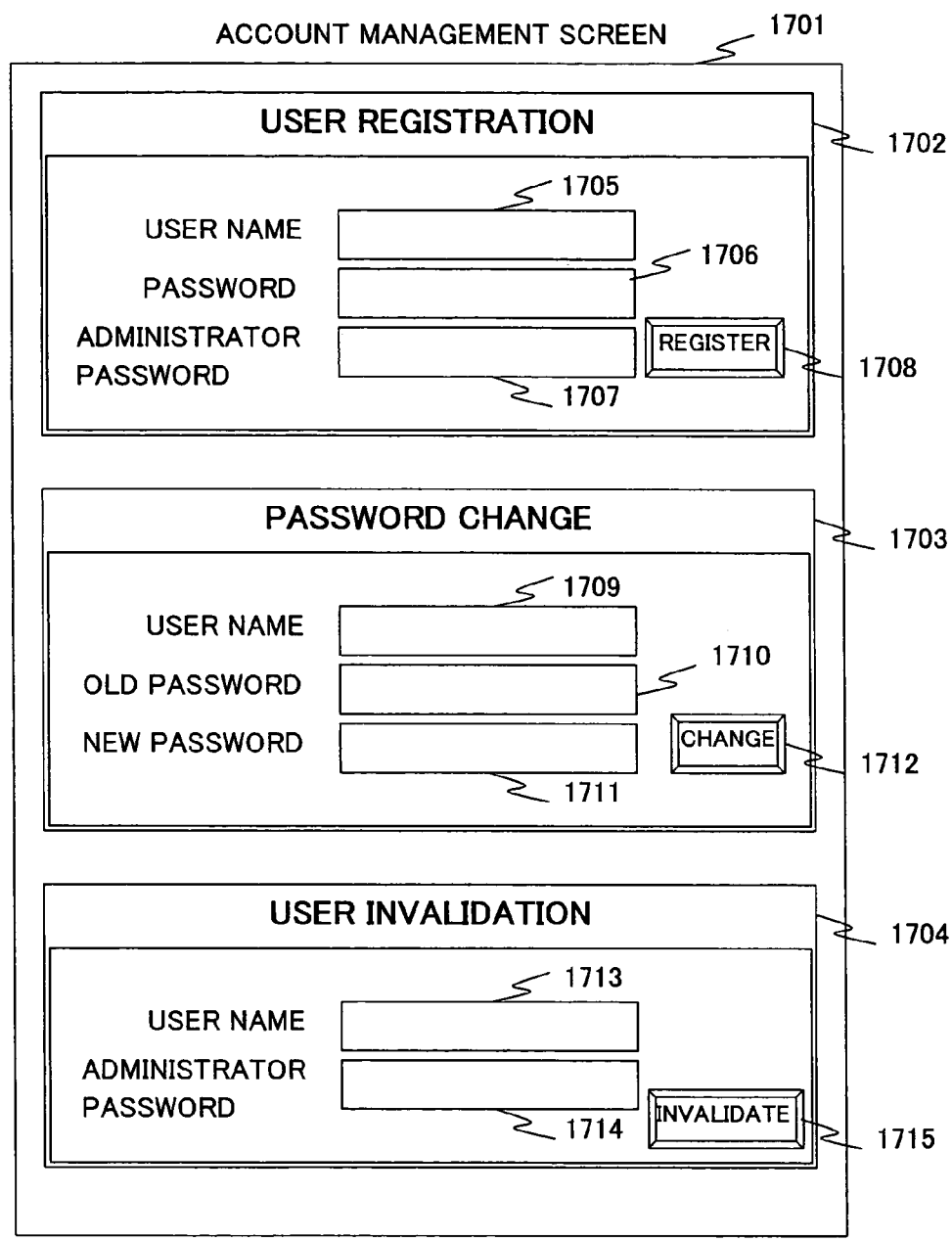
FIG. 17 is an explanatory diagram of an account management screen according to the first embodiment of the present invention.

In this embodiment, the administrator inputs these values from an account management screen 1701 (see FIG. 17).

Next, an entry E, in which the user name 702 is "root" and the password 703 is "A", is searched for from the password management table 111. When the entry E is found as a result of this search, it is judged that the person who called the user registration routine 201 is an authorized administrator and the processing is continued. On the other hand, when the entry E is not found, it is judged that the person who called the user registration routine 201 is not an authorized administrator and the processing is aborted (902).

Then, a vacant entry F (that is, an entry that is not yet allocated to any user) is searched for from the password management table 111. When such a vacant entry F is not found, it is impossible to newly register the user, so that the processing is aborted (903).

Following this, a current time T is obtained (904).

Next, the user name 702, the password 703, the validity term start time 704, and the validity term end time 705 in the entry F are respectively set at "U", "P", "T", and "CURRENT" (905), and the user registration routine 201 is ended. In this manner, the user U is newly registered in the password management table 111.

Figure 10:
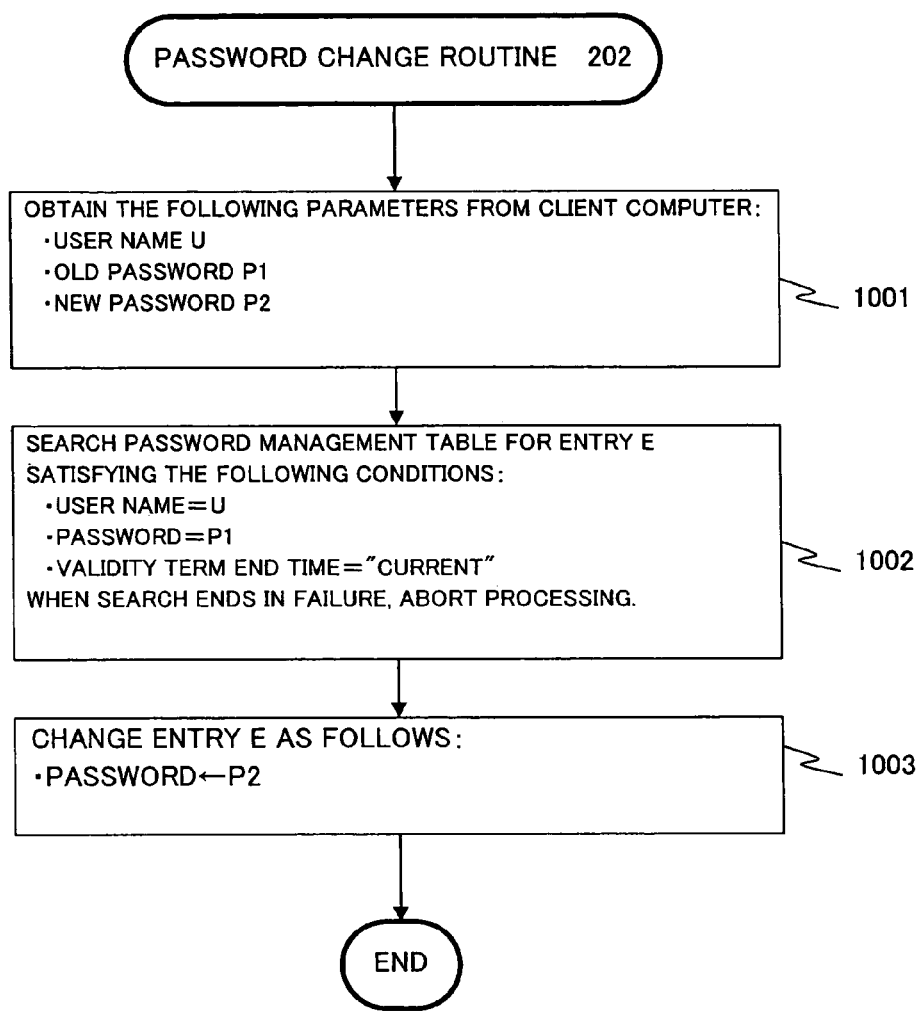
FIG. 10 is a flowchart of a password change routine according to the first embodiment of the present invention.

FIG. 10 is a flowchart of the password change routine 202 according to the first embodiment of the present invention.

The password change routine 202 is a subroutine, in which a user changes his/her password 703, and is called from a client computer 101.

When called from the client computer 101, the password change routine 202 obtains a user name U, an old password P1, and a new password P2 from the client computer 101 (1001). Here, the old password P1 is a password currently used by the user and the new password P2 is a password to be used after this change.

In this embodiment, the user inputs these values from the account management screen 1701 (see FIG. 17).

Next, an entry E, in which the user name 702 is "U", the password 703 is "P1", and the validity term end time 705 is "CURRENT", is searched for from the password management table 111. When the entry E is found as a result of this search, it is judged that the person who called the password change routine 202 is an authorized user and the processing is continued. On the other hand, if the entry E is not found, it is judged that the person who called the password change routine 202 is not an authorized user and the processing is aborted (1002).

Next, the password 703 in the entry E is changed from "P1" to "P2" (1003), and the password change routine 202 is ended. In this manner, the password 703 of the user U is changed.

Figure 11:
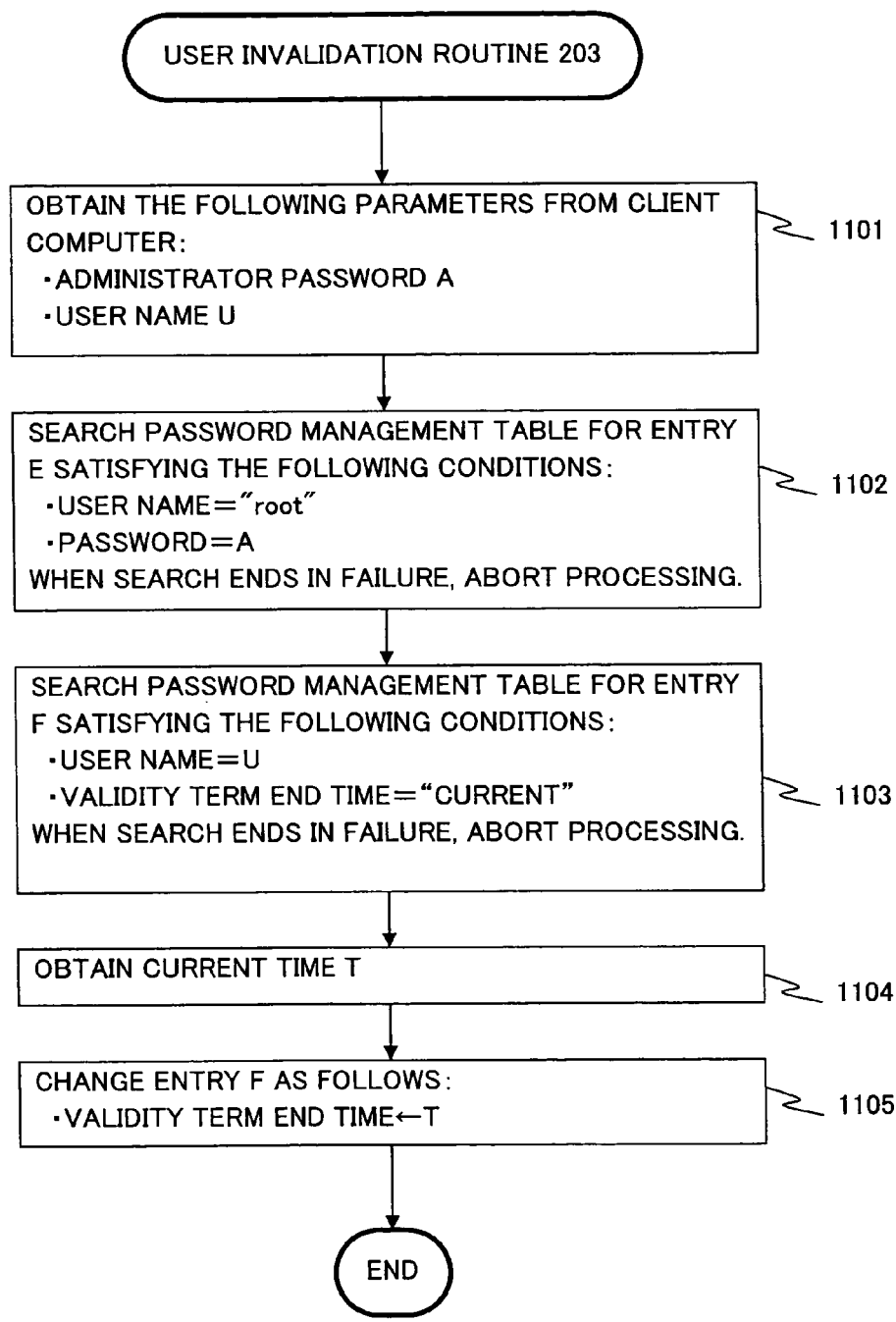
FIG. 11 is a flowchart of a user invalidation routine according to the first embodiment of the present invention.

FIG. 11 is a flowchart of the user invalidation routine 203 according to the first embodiment of the present invention.

The user invalidation routine 203 is a subroutine, in which a user is invalidated due to his/her retirement or the like, and is called by the administrator from the client computer 101.

When called from the client computer 101, the user invalidation routine 203 obtains an administrator password A and a user name U from the client computer 101 (1101). Here, the user name U represents a user that the administrator is attempting to invalidate.

In this embodiment, the administrator inputs these values from an account management screen 1701 (see FIG. 17).

Next, an entry E, in which the user name 702 is "root" and the password 703 is "A", is searched for from the password management table 111. When the entry E is found as a result of this search, it is judged that the person who called the user invalidation routine 203 is an authorized administrator and the processing is continued. On the other hand, when the entry E is not found, it is judged that the person who called the user invalidation routine 203 is not an authorized administrator and the processing is aborted (1102).

Next, an entry F, in which the user name 702 is "U" and the validity term end time 705 is "CURRENT", is searched for from the password management table 111. When the entry F is found as a result of this search, there exists the user who is the target of this invalidation, so that the processing is continued. On the other hand, if the entry F is not found, there does not exist the user who is the target of this invalidation, so that the processing is aborted (1103).

Then, the current time T is obtained (1104).

Next, the validity term end time 705 in the entry F is set at "T" (1105), and the user invalidation routine 203 is ended. In this manner, the user U is invalidated.

FIG. 12 is a flowchart of the log-in routine 204 according to the first embodiment of the present invention.

The log-in routine 204 is a subroutine, in which a user is allowed or prohibited to log in to the network storage system 103, and is called by the user from the client computer 101.

When called from the client computer 101, the log-in routine 204 obtains a user name U, a password P, and an IP address A from the client computer 101 (1201). Here, the user name U represents the user who is attempting to log in, the password P is a password used by the user, and the IP address A is an IP address of his/her client computer 101.

Figure 18:
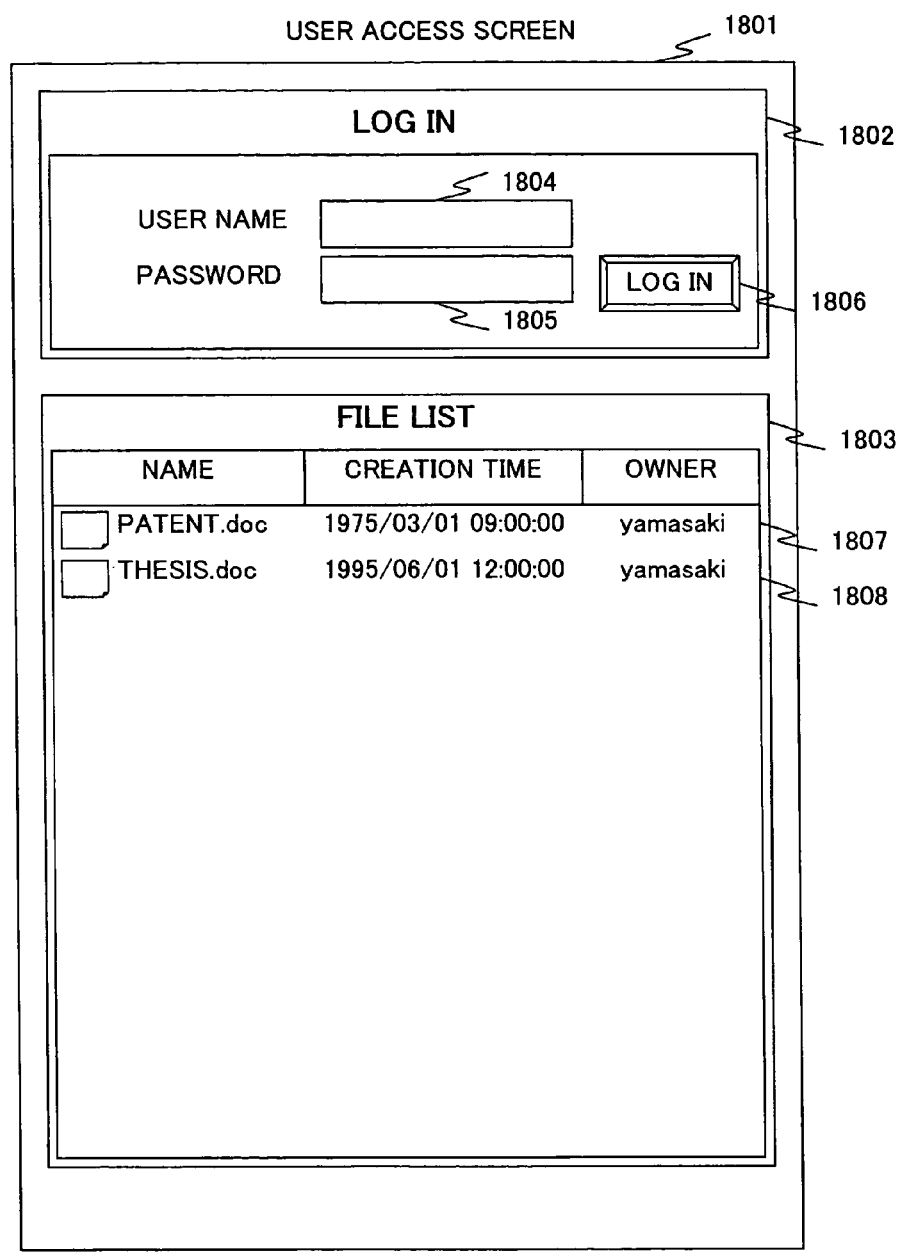
FIG. 18 is an explanatory diagram of a user access screen according to the first embodiment of the present invention.

In this embodiment, the user inputs the user name U and the password P from a user access screen 1801 (see FIG. 18).

Next, an entry E, in which the user name 702 is "U" and the password 703 is "P", is searched for from the password management table 111. When the entry E is found as a result of this search, it is judged that the person who called the log-in routine 204 is the user U, so that the validity term end time T in the entry E is obtained and the processing is continued. On the other hand, when the entry E is not found, it is judged that the person who called the log-in routine 204 is not the user U and the processing is aborted (1202).

Next, each entry F, in which the snapshot time 602 is a value preceding "T", is searched for from the file system management table 110 and the value N of the file system number 601 corresponding to the latest snapshot time 602 is obtained. Here, when "T" is set at the value "CURRENT", the value "N" is set at "1" indicating the current file system 112 (1203).

Next, a vacant entry L is obtained from the log-in management table 109 and the value of the IP address 501, the value of the user name 502, and the value of the file system number 503 in the vacant entry L are respectively set at "A", "U", and "N" (1204). Then, the log-in routine 204 is ended. It should be noted that when the vacant entry L is not found, it is impossible for the user to log in, so that the processing is aborted (1204).

As a result of this processing, when an existent user (user not invalidated) executes the log-in routine 204 using his/her user name 702 and password 703, he/she can access the current file system 112. On the other hand, when a user, who has taken over an access right from a nonexistent user, executes the log-in routine 204 using the user name 702 and the password 703 of the nonexistent user, he/she can access the latest one of snapshots created in a period, during which the nonexistent user existed, but cannot access the file system 112 (snapshot) created after the invalidation of the nonexistent user.

It should be noted that when a person attempting to log in using the user name 702 of a nonexistent user, knows the creation time (snapshot time) of a snapshot that he/she attempts to access, the snapshot time may be inputted in step 1201. In this case, in step 1203, an entry having the inputted snapshot time is searched for from the file system management table 110, its corresponding file system number N is obtained, and the processing proceeds to step 1204.

Figure 13:
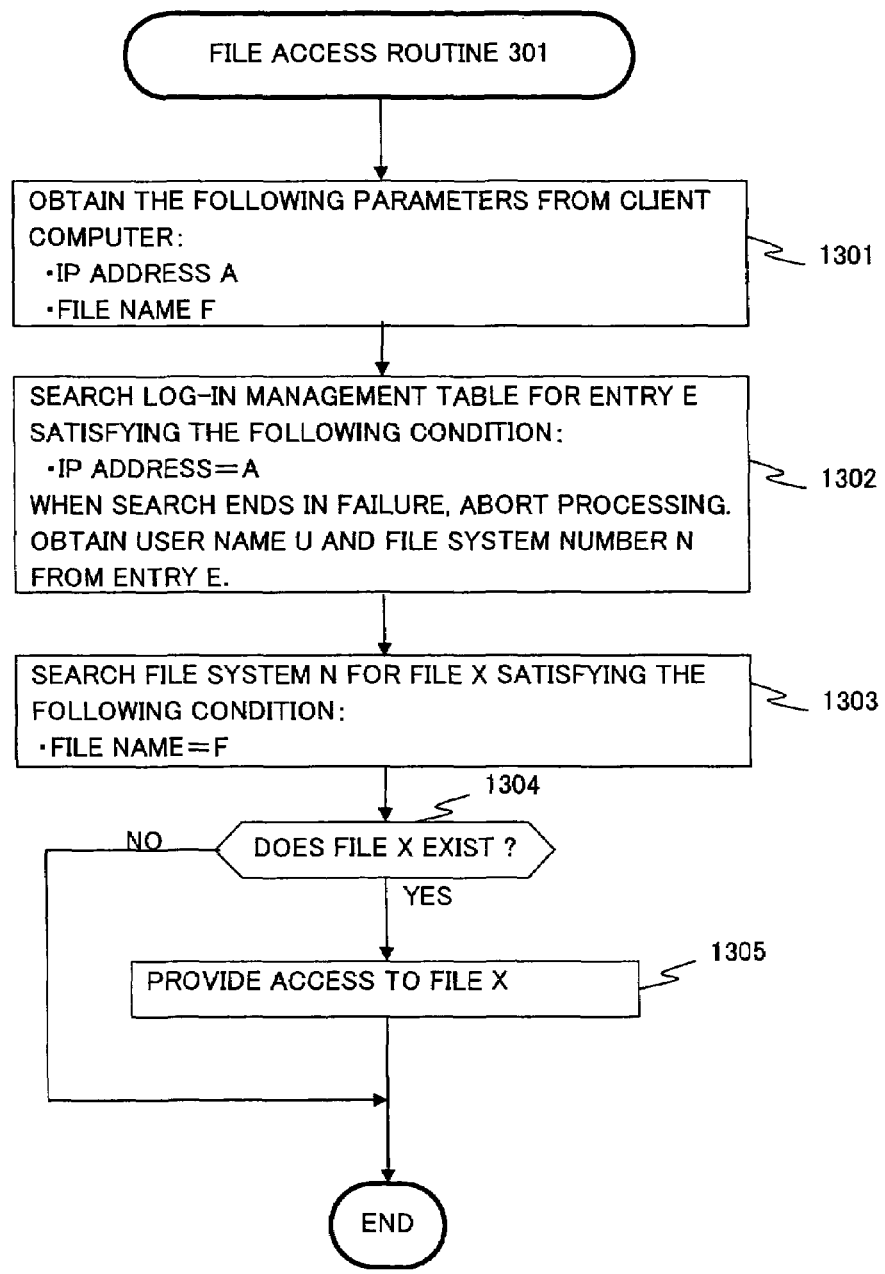
FIG. 13 is a flowchart of a file access routine according to the first embodiment of the present invention.

FIG. 13 is a flowchart of the file access routine 301 according to the first embodiment of the present invention.

The file access routine 301 is a subroutine, in which when an access request to a file 113 is received from a user, the objective file 113 is searched for from among the files 113 that the user can access and is provided to the user, and is called from the client computer 101 by the user.

When called from the client computer 101, the file access routine 301 obtains an IP address A and a file name F from the client computer 101 (1301). Here, the IP address A is an IP address of the client computer 101 and the file name F is the file name 801 of the file 113 that the user is attempting to access.

Next, an entry E, in which the IP address 501 is "A", is searched for from the log-in management table 109. When the entry E is not found, this means that the client computer 101 has not yet logged in to the network storage system 103 or a file system 112 that the logged-in user can access does not exist, so that the processing is aborted. On the other hand, if the entry E is found, the value U of the user name 502 and the value N of the file system number 503 are obtained from the entry E (1302).

Next, a file 113 (illustrated as the "file X" in FIG. 13), whose file name 801 is "F", is searched for from the file system 112 having the file system number "N" (1303).

Next, it is judged whether the file X exists or not (1304). If a result of this judgment is negative, this means that the file X does not exist in the disk device 105 or exists in a file system 112 that the user cannot access, so that the file access routine 301 is ended without providing the access to the file X.

On the other hand, if the result of the judgment in step 1304 is positive, the access to the file X is provided to the user (1305) and the file access routine 301 is ended.

Figure 14:
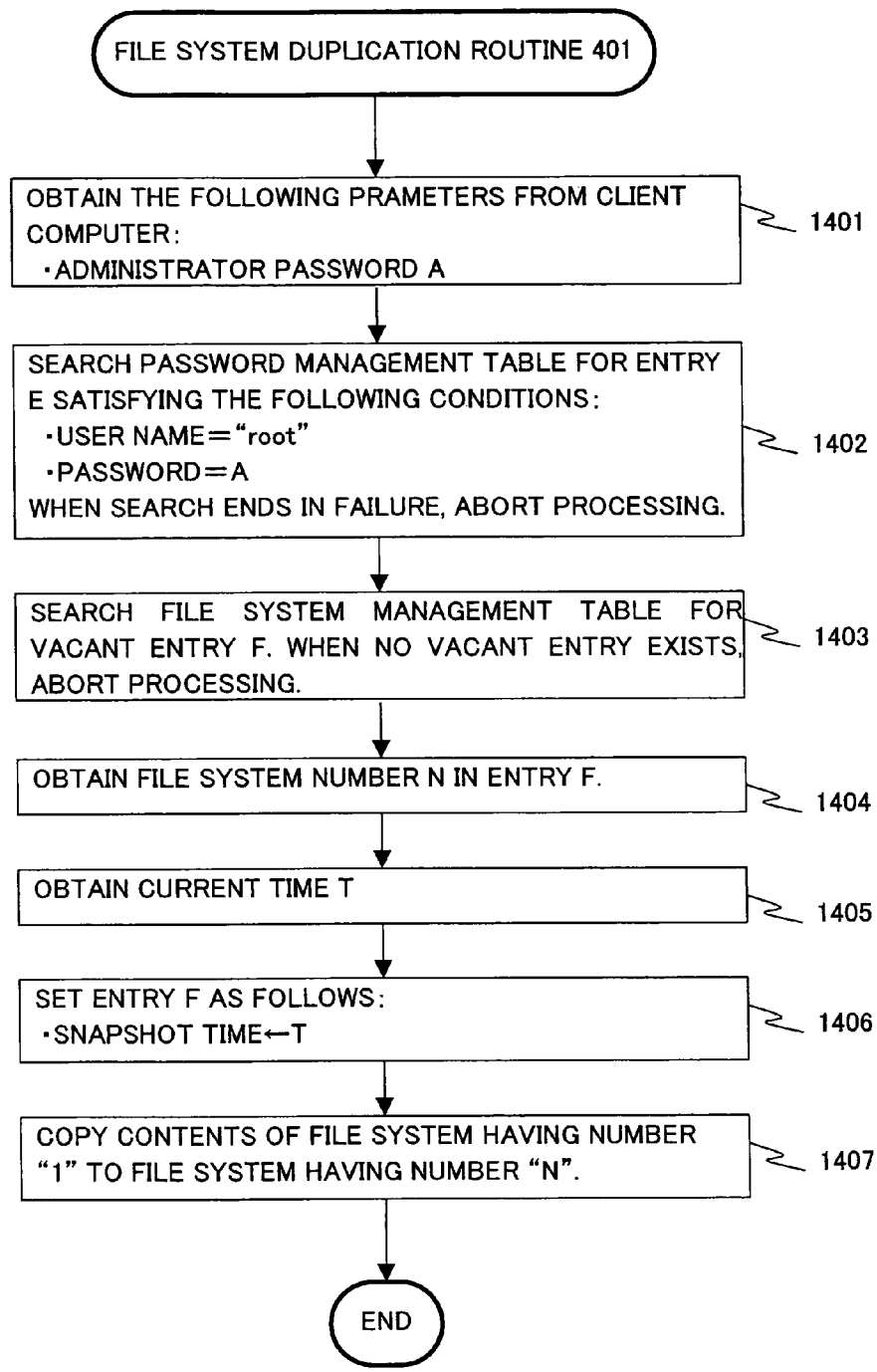
FIG. 14 is a flowchart of a file system duplication routine according to the first embodiment of the present invention.

FIG. 14 is a flowchart of the file system duplication routine 401 according to the first embodiment of the present invention.

The file system duplication routine 401 is a subroutine, in which an administrator creates a duplication of the current file system 112, and is called by the administrator from the client computer 101. As described above, this duplication of the file system 112 is also referred to as the "snapshot".

When called from the client computer 101, the file system duplication routine 401 obtains an administrator password A from the client computer 101 (1401).

Next, an entry E, in which the user name 702 is set at "root" and the password 703 is set at "A", is searched for from the password management table 111. When the entry E is found as a result of this search, it is judged that the person who called the file system duplication routine 401 is an authorized administrator and the processing is continued. On the other hand, when the entry E is not found, it is judged that the person who called the file system duplication routine 401 is not an authorized administrator and the processing is aborted (1402).

Next, a vacant entry F (that is, an entry whose snapshot time 602 is set at the value "EMPTY") is searched for from the file system management table 110. When such a vacant entry F is not found, it is impossible to newly create the additional file system 112, so that the processing is aborted (1403).

On the other hand, when the vacant entry F is found, in order to newly create the additional file system 112, the file system number N in the entry F is acquired (1404).

Next, the current time T is acquired (1405).

Then, the value of the snapshot time 602 in the entry F is set at "T" (1406). This means that the creation time of the snapshot corresponding to the entry F is "T".

Following this, the contents of the file system 112 having the file system number "1" (that is, the current file system 112) are duplicated to the file system 112 having the file system number N (1407) and the file system duplication routine 401 is ended. In this manner, a duplication (snapshot) of the current file system 112 at the time T is created.

Figure 15:
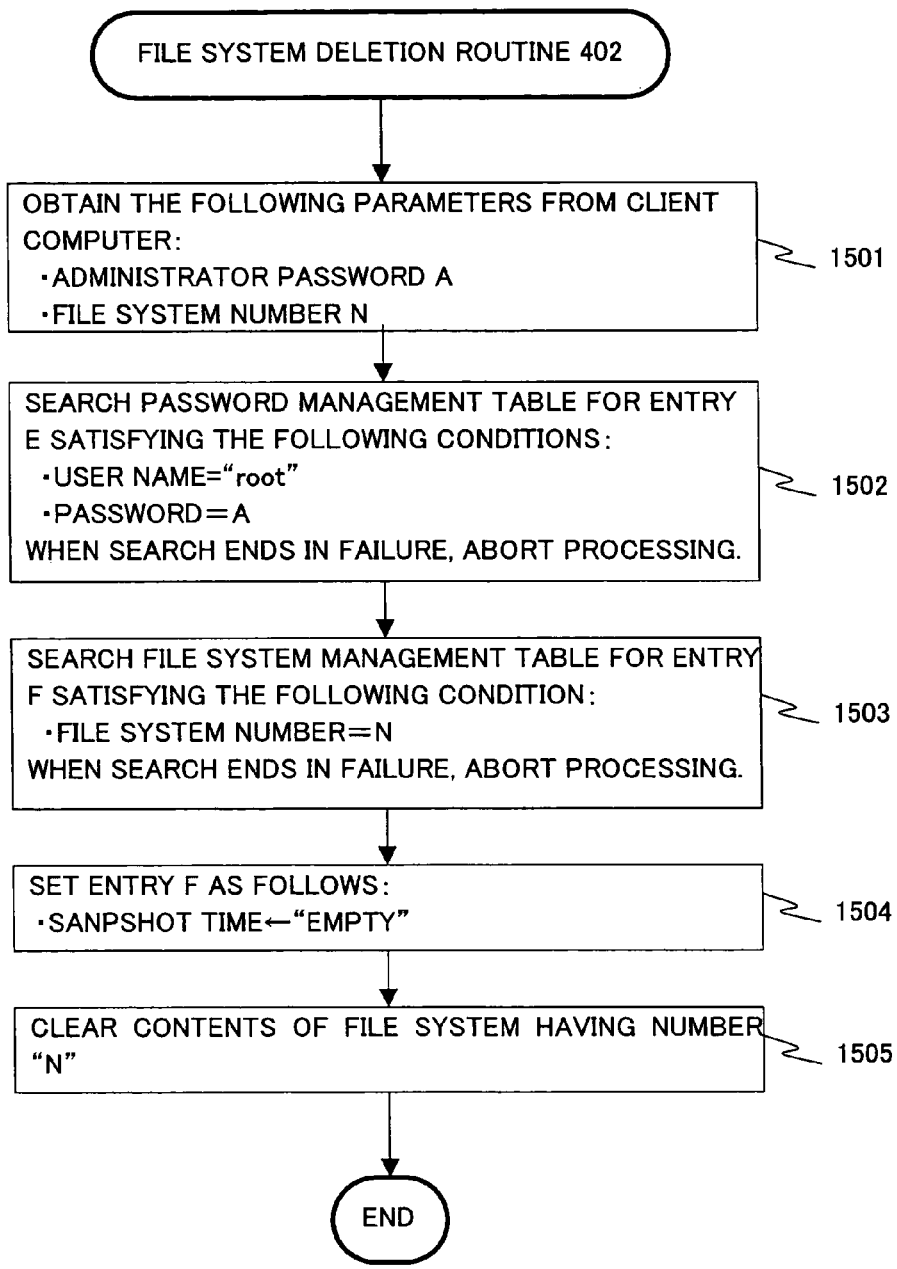
FIG. 15 is a flowchart of a file system deletion routine according to the first embodiment of the present invention.

FIG. 15 is a flowchart of the file system deletion routine 402 according to the first embodiment of the present invention.

The file system deletion routine 402 is a subroutine, in which the administrator deletes the file system 112, and is called by the administrator from the client computer 101.

When called from the client computer 101, the file system deletion routine 402 obtains an administrator password A and a file system number N from the client computer 101 (1501). Here, the file system number N is the number 601 of the file system 112 that the administrator attempts to delete.

Next, an entry E, in which the user name 702 is set at "root" and the password 703 is set at "A", is searched for from the password management table 111. When the entry E is found as a result of this search, it is judged that the person who called the file system deletion routine 402 is an authorized administrator and the processing is continued. On the other hand, when the entry E is not found, it is judged that the person who called the file system deletion routine 402 is not an authorized administrator and the processing is aborted (1502).

Next, an entry F, in which the value of the file system number 601 is set at "N", is searched for from the file system management table 110. When the entry F is found as a result of this search, in order to delete the file system 112 corresponding to the entry F, the processing is continued. On the other hand, when the entry F is not found, this means that the file system 112 that the administrator attempts to delete does not exist, so that the processing is aborted (1503).

Then, the value of the snapshot time 602 in the entry F is set at "EMPTY" (1504).

Following this, every file 113 in the file system 112, whose file system number 601 is set at the value "N", is deleted from the disk device 105 (1505) and the file system deletion routine 402 is thereby ended.

Figure 16:
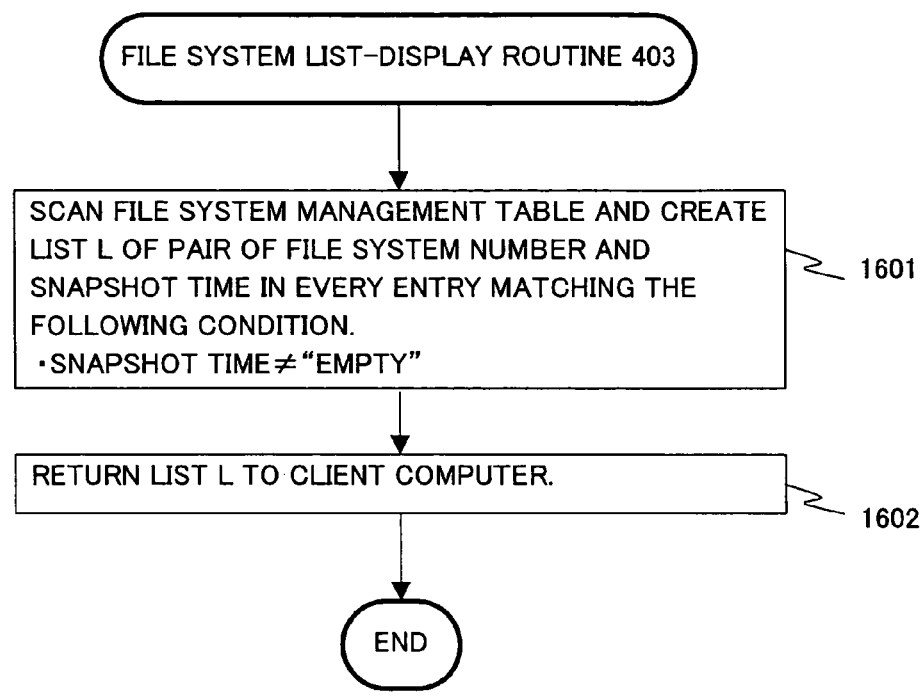
FIG. 16 is a flowchart of a file system list-display routine according to the first embodiment of the present invention.

FIG. 16 is a flowchart of the file system list-display routine 403 according to the first embodiment of the present invention.

The file system list-display routine 403 is a subroutine, in which a list-display of the number 601 and the snapshot time 602 of every file system 112 existing in the disk device 105 is created, and is called from the client computer 101.

When called from the client computer 101, the file system list-display routine 403 creates a list-display (list) L of a pair of the file system number 601 and the snapshot time 602 in each entry in which the value of the snapshot time 602 is not set at "EMPTY" (that is, each entry corresponding one of the file systems 112 existing in the disk device 105) from the file system management table 110 (1601).

Next, the created list L is returned to the client computer 101 (1602) and the file system list-display routine 403 is thereby ended.

FIG. 17 is an explanatory diagram of the account management screen 1701 according to the first embodiment of the present invention.

The account management screen 1701 is a screen used by the administrator or a user to manage the user account information and is displayed on a screen display device (not shown) of the client computer 101.

The administrator or the user commands the execution of the user registration routine 201, the password change routine 202, or the user invalidation routine 203 on the account management screen 1701 and inputs a user name 702, a password 703, and the like that are necessary at the time of execution of the routine. In the example illustrated in FIG. 17, a graphical user interface (GUI), through which a command is inputted by operating a pointing device (mouse, for instance), is adopted in addition to the input of characters with a keyboard, thereby improving convenience.

The account management screen 1701 is composed of a user registration area 1702, a password change area 1703, and a user invalidation area 1704.

The user registration area 1702 is an area used by the administrator to register a new user and includes a user name input field 1705, a password input field 1706, an administrator password input field 1707, and a registration button 1708.

The administrator inputs a user name U that he/she attempts to register, a password P to be given to the user, and the administrator password A, respectively, into the user name input field 1705, the password input field 1706, and the administrator password input field 1707, and operates the registration button 1708 (places a mouse cursor on the registration button and clicks on it, for instance). As a result, the user registration routine 201 is called and is executed (see FIG. 9). In this manner, the new user U is registered.

The password change area 1703 is an area used by a user to change his/her password and includes a user name input field 1709, an old password input field 1710, a new password input field 1711, and a change button 1712.

When the user inputs his/her user name U, a current password P1, and a new password P2 to be used after this change, respectively, into the user name input field 1709, the old password input field 1710, and the new password input field 1711 and operates the change button 1712, the password change routine 202 is called and is executed (see FIG. 10). As a result, the password of the user U is changed.

The user invalidation area 1704 is an area used by the administrator to invalidate a user and includes a user name input field 1713, an administrator password input field 1714, and an invalidation button 1715.

When the administrator inputs the user name U that he/she attempts to invalidate and the administrator password A, respectively, into the user name input field 1713 and the administrator password input field 1714 and operates the invalidation button 1715, the user invalidation routine 203 is called and is executed (see FIG. 11). As a result, the user U is invalidated.

FIG. 18 is an explanatory diagram of the user access screen 1801 according to the first embodiment of the present invention.

The user access screen 1801 is a screen with which a user accesses the network storage system 103, and is displayed on the screen display device (not shown) of the client computer 101.

The user commands the execution of the log-in routine 204 on the user access screen 1801 and inputs a user name 702 and a password 703 that are required at the time of the execution of this routine. In the example illustrated in FIG. 18, as in the example illustrated in FIG. 17, a GUI is adopted to thereby improve convenience. Also, on the user access screen 1801, a list of the files 113 owned by the logged-in user is displayed.

The user access screen 1801 is composed of a log-in area 1802 and a file list-display area 1803.

The log-in area 1802 is an area used for the user to log in to the network storage system 103 and includes a user name input field 1804, a password input field 1805, and a log-in button 1806.

When the user inputs his/her user name U and the password P, respectively, into the user name input field 1804 and the password input field 1805 and operates the log-in button 1806, the log-in routine 204 is called and is executed (see FIG. 12). As a result, the user with the user name U logs in to the network storage system 103.

In the file list-display area 1803, the name 801, the creation time 802, and the owner 803 of every file 113 contained in the file system 112 in the network storage system 103, to which the user has logged in, are displayed in a list. This list-display is obtained by the user executing the file list-display routine 302. Here, the list-display may be obtained through automatic execution of the file list-display routine 302 when the user logs in to the system.

In the example shown in FIG. 18, in the file list-display area 1803, a file "patent. doc" (1807) and a file "thesis. doc" (1808) are displayed. This means that only the two files 113 are contained in the file system 112 that the logged-in user can access.

When the user has an access right, he/she can access the files 113 through execution of the file access routine 301 with respect to the files 113 (see FIG. 13).

Also, the user may command the execution of the file access routine 301 by operating a mouse (by double-clicking on the display of the file 113 that the user aims to access, for instance).

As described above, according to the first embodiment of the present invention, the registration of the user name and the password of a nonexistent user is not deleted, so that it becomes possible to delegate the access to a file owned by the user to another user other than an administrator with ease.

Also, a validity term is set for each pair of a user name and a password and, unless overlapping of this validity term does not occur, it is possible to register the same user name for different users, so that convenience is improved.

Further, when an existent user logs in to the network storage system using his/her user name and password, a file system currently used is provided. On the other hand, when the existent user logs in to the network storage system using the user name and password of a nonexistent user, a file system (snapshot) created when the nonexistent user existed is provided. As a result, once the user has logged in to the system, it becomes unnecessary to confirm whether the user has an access right each time he/she attempts to access a file.

Next, a second embodiment of the present invention will be described. The second embodiment of the present invention differs from the first embodiment described above in that the file is provided to a user on a file unit basis in place of on a file system (snapshot basis).

It should be noted that in the second embodiment, the detailed description of the same portions as in the first embodiment described above will be omitted.

Figure 19:
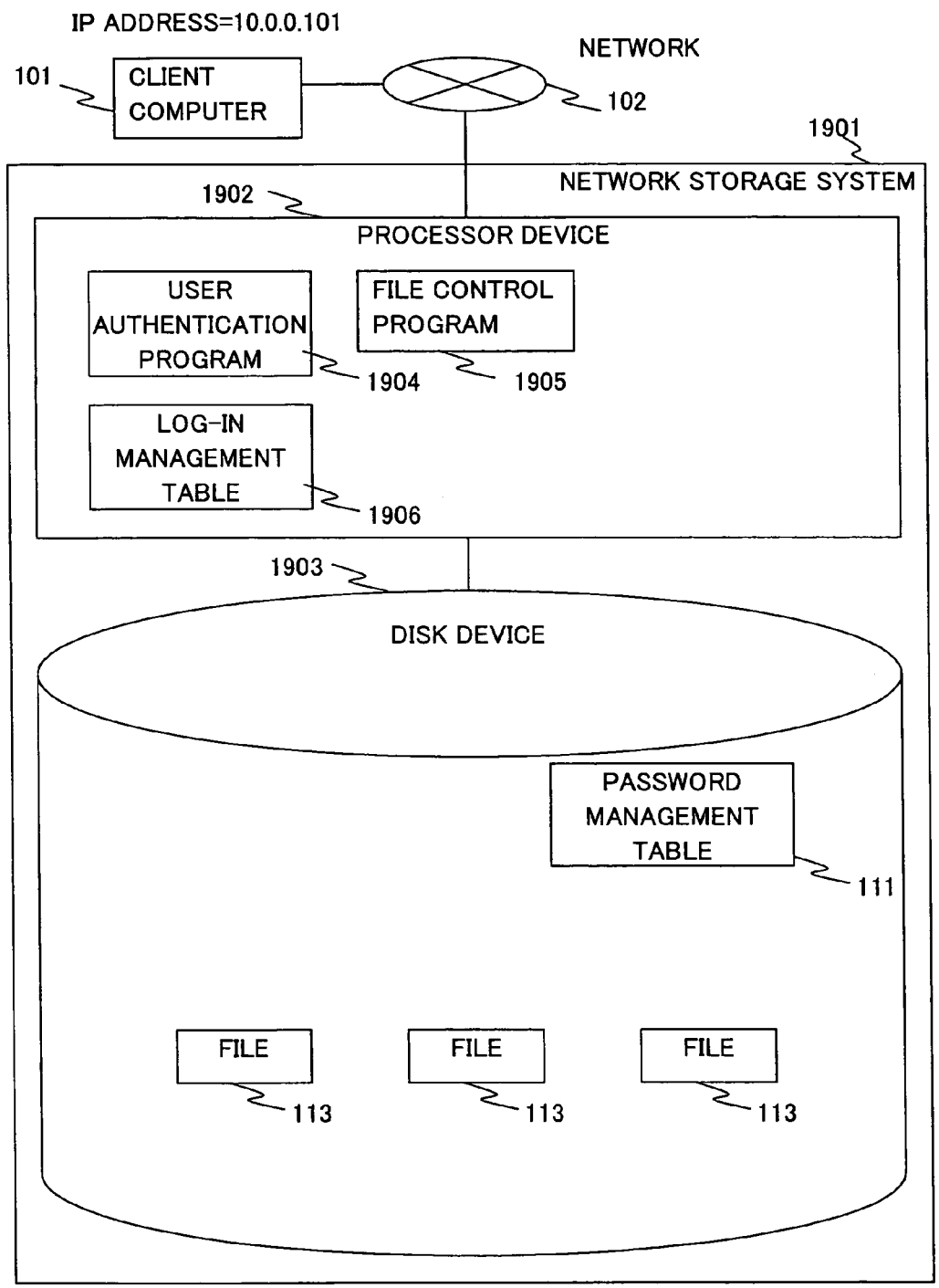
FIG. 19 is a block diagram of a network storage system according to a second embodiment of the present invention.

FIG. 19 is a block diagram of a network storage system according to the second embodiment of the present invention.

A network storage system 1901 is communicably connected to the client computer 101 through the network 102.

The network storage system 1901 includes a processor device 1902 and a disk device 1903 and performs data writing/reading in accordance with each request from the client computer 101.

The processor device 1902 includes a CPU (not shown), a memory (not shown), an interface (not shown), and the like, processes each data writing/reading request from the client computer 101, and manages data to be recorded on the disk device 1903. On the memory (not shown) of the processor device 1902, a user authentication program 1904, a file control program 1905, and a log-in management table 1906 are recorded. Of those, each program is executed by the CPU (not shown) of the processor device 1902.

The disk device 1903 is, for instance, a magnetic disk device and may be a single disk drive or a disk array composed of multiple disk drives. On the disk device 1903, the password management table 111 and the one or more files 113 are recorded. Each file 113 is a file recorded in response to a writing request from the client computer 101.

Figure 20:
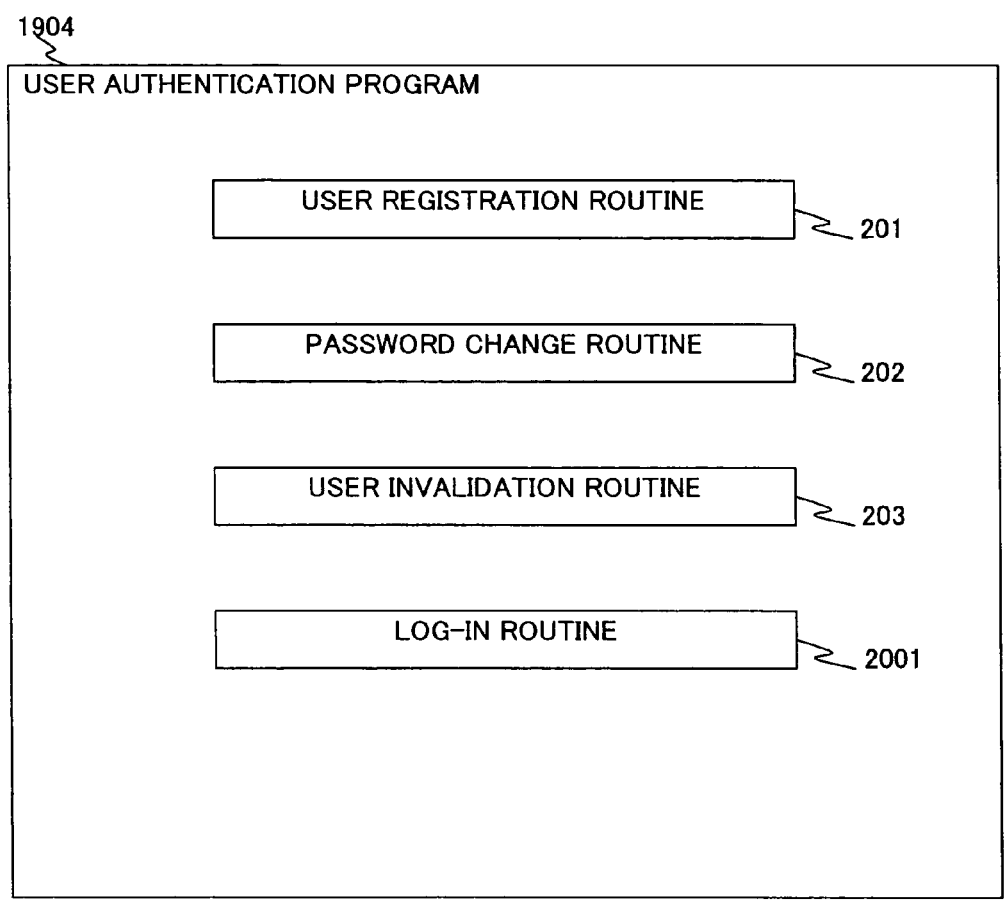
FIG. 20 is an explanatory diagram of a configuration of a user authentication program according to the second embodiment of the present invention.

FIG. 20 is an explanatory diagram of a configuration of the user authentication program 1904 according to the second embodiment of the present invention.

The user authentication program 1904 is composed of the user registration routine 201, the password change routine 202, the user invalidation routine 203, and a log-in routine 2001. Of those, the user registration routine 201, the password change routine 202, and the user invalidation routine 203 are the same as those in the first embodiment of the present invention. Also, the log-in routine 2001 will be described in detail with reference to FIG. 23.

Figure 21:
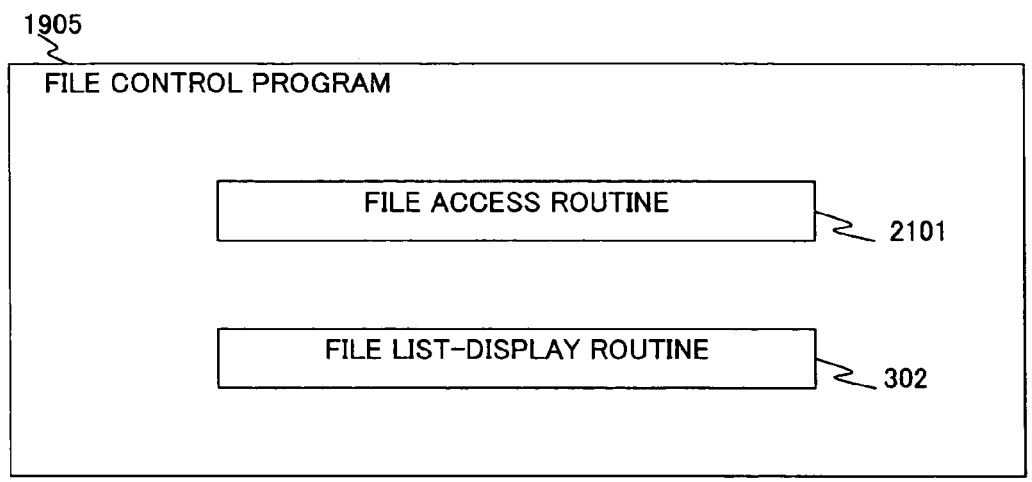
FIG. 21 is an explanatory diagram of a configuration of a file control program according to the second embodiment of the present invention.

FIG. 21 is an explanatory diagram of a configuration of the file control program 1905 according to the second embodiment of the present invention.

The file control program 1905 is composed of a file access routine 2101 and the file list-display routine 302. Of those, the file access routine 2101 will be described in detail with reference to FIG. 24.

Also, the file list-display routine 302 is the same as that in the first embodiment of the present invention.

FIG. 22 is an explanatory diagram of the log-in management table 1906 according to the second embodiment of the present invention.

The log-in management table 1906 is a table in which correspondences between users, who have logged in to the network storage system 1901, and their validity terms are registered. The log-in management table 1906 is updated by the log-in routine 2001 and is referred to by the file access routine 2101.

In the log-in management table 1906, information is registered on an entry basis. Each entry is composed of an IP address 501 as well as a user name 502, a validity term start time 2201, and a validity term end time 2202 corresponding to the IP address 501.

Each IP address 501 is the IP address of one of the client computers 101 that have logged in to the network storage system 1901.

Each user name 502 is the name of a user who uses the client computer 101 having its corresponding IP address 501. It should be noted that the user name 502 is a user name registered by an administrator of the network storage system 1901 through execution of the user registration routine 201.

Figure 23:
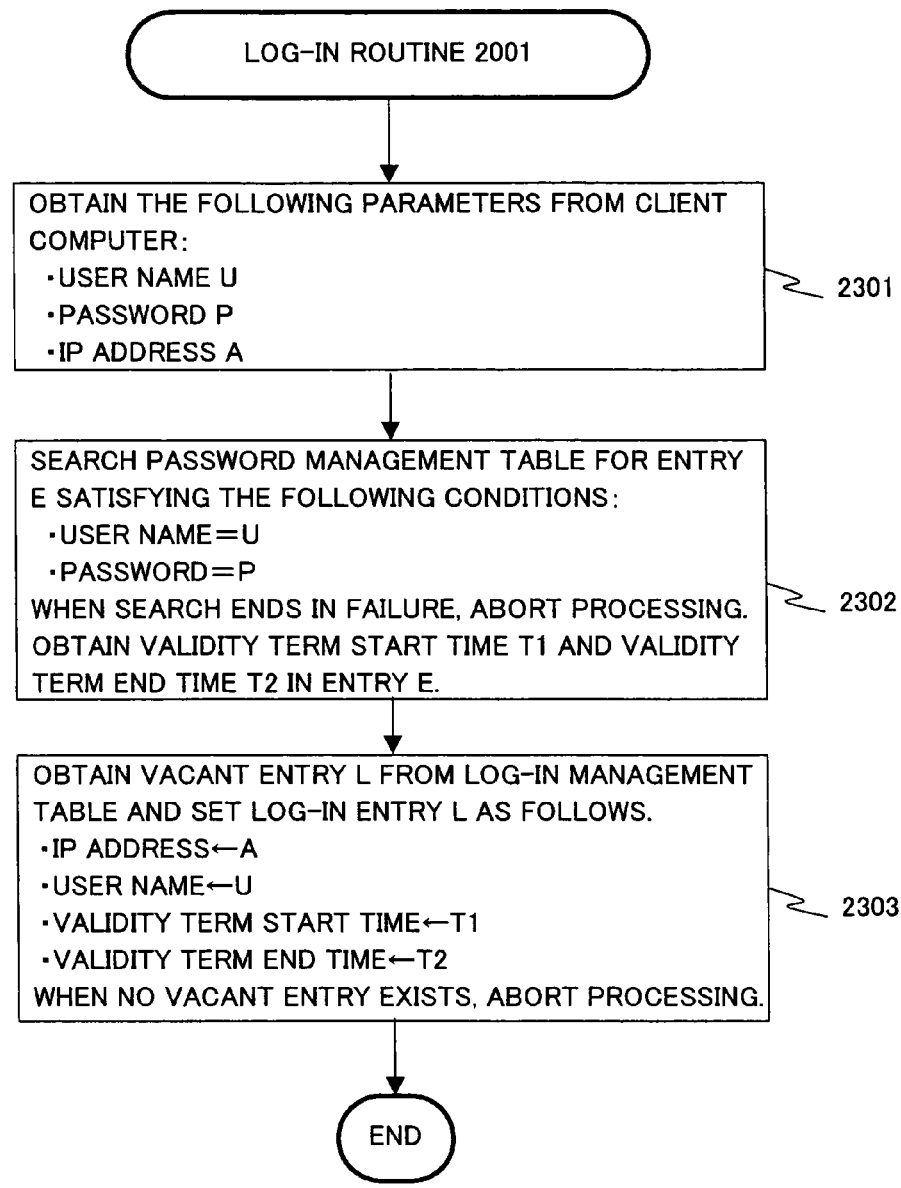
FIG. 23 is a flowchart of a log-in routine according to the second embodiment of the present invention.

Each validity term start time 2201 and each validity term end time 2202 respectively correspond to the start and the end of the validity term of a user who uses the client computer 101 having their corresponding IP address 501, and are times registered by the log-in routine 2001 by referring to the password management table 111 using the user name and the password used by the user at the time of log-in (see FIG. 23).

In the example illustrated in FIG. 22, the user name 502 in the first entry and the user name 502 in the third entry are both set at the same user name "yamasaki", although the validity term start time 2201 in the first entry is set at "Apr. 1, 1990 00:00:00" and the validity term end time 2202 in the third entry is set at "Mar. 31, 1979 23:59:59". This means that the person having the user name "yamasaki" in the third entry is different from the person having the user name "yamasaki" in the first entry and is a user who was existent in the past but is not existent at present. The validity terms of those persons "yamasaki" do not overlap each other, so that they can use the same user name 502.

FIG. 23 is a flowchart of the log-in routine 2001 according to the second embodiment of the present invention.

The log-in routine 2001 is a subroutine, in which a user is allowed or prohibited to log in to the network storage system 1901, and is called by the user from the client computer 101.

When called from the client computer 101, the log-in routine 2001 obtains a user name U, a password P, and an IP address A from the client computer 101 (2301). Here, the user name U is a name of the user who attempts to log in to the system, the password P is a password used by the user, and the IP address A is an IP address of the client computer 101.

In this embodiment, the user inputs his/her user name U and password P from the user access screen 1801 (see FIG. 18).

Next, an entry E, in which the user name 702 is "U" and the password 703 is "P", is searched for from the password management table 111. When the entry E is found as a result of this search, it is judged that the person who called the log-in routine 2001 is the user U, so that a validity term start time T1 and a validity term end time T2 in the entry E are obtained and the processing is continued. On the other hand, when the entry E is not found, it is judged that the person who called the log-in routine 2001 is not the user U and the processing is aborted (2302).

Next, a vacant entry L is obtained from the log-in management table 1906 and the value of the IP address 501, the value of the user name 502, the value of the validity term start time 2201, and the value of the validity term end time 2202 in the vacant entry L are respectively set at "A", "U", "T1", and "T2". Then, the log-in routine 2001 is ended. It should be noted that when the vacant entry L does not exist, it is impossible to log in to the network storage system 1901, so that the processing is aborted (2303).

Figure 24:
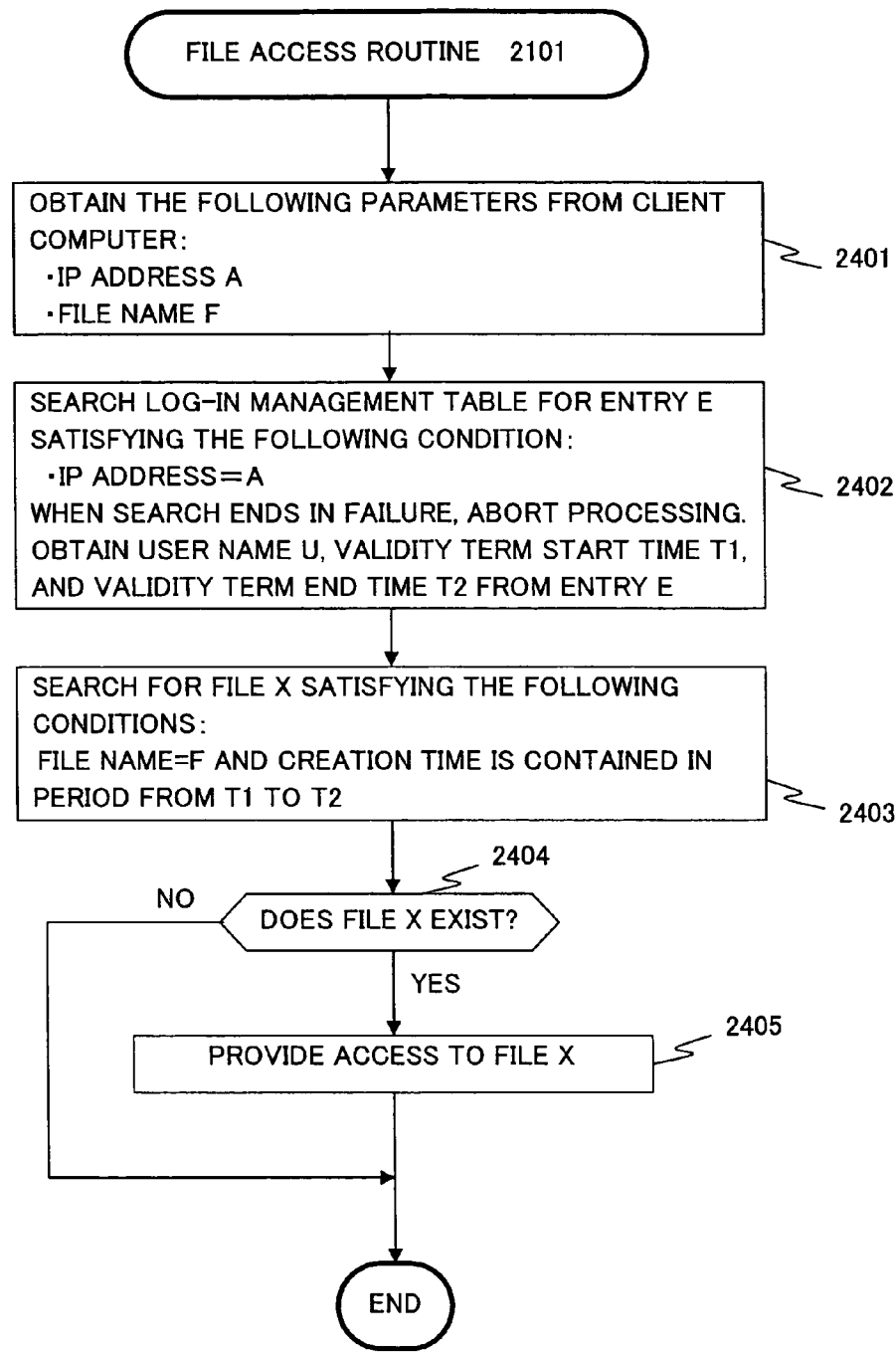
FIG. 24 is a flowchart of a file access routine according to the second embodiment of the present invention.

FIG. 24 is a flowchart of the file access routine 2101 according to the second embodiment of the present invention.

The file access routine 2101 is a subroutine, in which when an access request to the file 113 is received from a user, the objective file 113 is searched for and is provided to the user, and is called by the user from the client computer 101.

When called from the client computer 101, the file access routine 301 obtains an IP address A and a file name F from the client computer 101 (2401). Here, the IP address A is an IP address of the client computer 101 and the file name F is a file name 801 of the file 113 that the user attempts to access.

Next, an entry E, in which the IP address 501 is "A", is searched for from the log-in management table 1906. When the entry E is not found, this means that the client computer 101 has not yet logged in to the network storage system 1901, so that the processing is aborted. On the other hand, when the entry E is found, the value U of the user name 502, the value T1 of the validity term start time 2201, and the value T2 of the validity term end time 2202 are obtained from the entry E (2402).

Next, the file 113 (illustrated as the "file X" in FIG. 24), whose file name 801 is set at the value "F" and creation time 802 is contained in a period from the validity term start time T1 to the validity term end time T2, is searched for from the disk device 1903 (2403).

Next, it is judged whether the file X exists (2404). If a result of this judgment is negative, this means that the file, whose file name 801 is set at the value "F", does not exist in the disk device 1903 or the user cannot access the file, so that the file access routine 2101 is ended without allowing the access to the file X.

On the other hand, if the result of the judgment is positive, the access to the file X is allowed for the user (2405) and the file access routine 2101 is ended.

As a result of this processing, a user, who has taken over an access right from a nonexistent user, can log in to the network storage system 103 using the user name 702 and the password 703 of the nonexistent user, although the files 113 that he/she can access are limited to files created when the nonexistent user was enrolled. That is, so long as the user, who has taken over the access right, logs in using the user name 702 and the password 703 of the nonexistent user, he/she cannot access the files 113 created after the invalidation of the nonexistent user.

As described above, according to the second embodiment of the present invention, the registration of the user name and the password of a nonexistent user is not deleted, so that it is possible to delegate the access to a file owned by the user to another user other than an administrator with ease.

Also, a validity term is set for each pair of a user name and a password and it is possible to register the same user name for different users unless overlapping of this validity term does not occur, so that convenience is improved.

Further, each time a user attempts to access a file, his/her access right is authorized using the user name and the password used at the time of log-in. Therefore, even when a snapshot is not created in the disk device or a snapshot is not created at an appropriate point in time, it is possible to allow the access to a necessary file within the range of the access right.

It should be noted that the first and second embodiments described above are also applicable to a so-called file system provided as a function of an operating system.

According to the present invention, there is provided means applicable to a storage system connected to a network to delegate the access to old data with ease and reliability.

What is claimed is:

1. A storage medium having stored thereon an authentication program for permitting a user, who is attempting to log in to a storage system which includes a disk device for storing data and a processor which controls access to the disk device, to access a file recorded in the storage system, the authentication program, when executed by the processor, performs;

a first step for receiving a user name and a password from the user;

a second step for referring to a validity term corresponding to a pair of the user name and the password recorded in the storage system; and a third step for permitting access by the user to a file corresponding to the validity term based on a result of the second step, the first to third steps being executed by a processor, wherein the second step includes searching a file system, whose creation time is within the validity term, from among file systems recorded in the storage system, and wherein the third step includes permitting the user to access the file in the file system.

2. The storage medium having stored thereon the authentication program according to claim 1, wherein the second step includes searching a file system, whose creation time is within the validity term and is latest, from among the file systems recorded in the storage system.

3. The storage medium having stored thereon the authentication program according to claim 1, wherein the first step includes receiving a first time from the user, and wherein the second step includes searching a file system, whose creation time is within the validity term and is the first time, from among the file systems recorded in the storage system.

4. The storage medium having stored thereon the authentication program according to claim 1, wherein the third step includes referring to a creation time of each file recorded in the file and permitting the user to access the file whose creation time is within the validity term.

5. A storage medium having stored thereon an operating system program for being executed by a computer to run other programs, the operating system program being executed by the computer, comprising:

a log-in request reception module that receives a user name and a password;

an authentication information storage module in which preset registration user names and registration passwords are stored; and an authentication module that compares the received user name and the received password with the registration user names and the registration passwords and, when a matching result is obtained, gives an access right to a file, wherein the authentication information storage module stores validity terms corresponding to the registration user names and the registration passwords, and wherein, when the received user name and the received password match any one of the registration user names and any one of the registration passwords, the authentication module gives an access right to a file in a file system whose creation time is within the corresponding validity term.

6. The storage medium having stored thereon the operating system program according to claim 5, wherein when the received user name and the received password match any one of the registration user names and any one of the registration passwords, the authentication module gives an access right to a file in a file system whose creation time is within the corresponding validity term and is latest.

7. The storage medium having stored thereon the operating system program according to claim 5, wherein the log-in request reception module receives a first time, and wherein, when the received user name and the received password match any one of the registration user names and any one of the registration passwords, the authentication module gives an access right to a file in a file system whose creation time is within the corresponding validity term and is the first time.

8. The storage medium having stored thereon the operating system program according to claim 5, wherein when the received user name and the received password match any one of the registration user names and any one of the registration passwords, the authentication module gives an access right to a file whose creation time is within the corresponding validity term.

9. A storage system that is communicably connected to a client computer through a network, comprising a processor device and a disk device,
   wherein in the disk device, at least one file system including a first file system that is currently used is recorded, with each file system containing at least one file and each file system other than the first file system being a second file system created through duplication of the first file system at an arbitrary point in time,
   wherein the disk device comprises:
   an authentication information storage unit in which each user name, a password corresponding to the user name, and a validity term corresponding to a pair of the user name and the password are recorded; and
   a file system management information storage unit in which a creation time of each file system is recorded, and
   the processor device configured to:
   receive a user name and a password from a user who is attempting to log in to the storage system;
   search for a pair of the user name and the password from the authentication information storage unit;
   refer to the validity term corresponding to the pair of the user name and the password recorded in the authentication information storage unit and the creation time of each file system recorded in the file system management information storage unit, and searches for a file system whose creation time is within the corresponding validity term and is latest; and
   permit access by the user to a file in the file system.

10. A storage system that is communicably connected to a client computer through a network, comprising a processor device and a disk device,
    wherein in the disk device, at least one file, each of which contains information about an owner name of the file and information about a creation time of the file, is recorded,
    wherein the disk device comprises an authentication information storage unit in which each user name, a password corresponding to the user name, and a validity term corresponding to a pair of the user name and the password are recorded, and
    wherein the process device configured to:
    receive a user name and a password from a user who is attempting to log in to the storage system;
    search for a pair of the user name and the password from the authentication information storage unit;
    refer to the validity term corresponding to the pair of the user name and the password recorded in the authentication information storage unit; and
    permit access by the user to a file, whose creation time is within the corresponding validity term, out of files whose owner names are the user name.

11. An authentication method for permitting a user, who is attempting to log in to a storage system which includes a disk device for storing data and a processor which controls access to the disk device, to access a file recorded in the storage system, said authentication method, performed by the processor, comprising:
    a first step of receiving a user name and a password from the user;
    a second step of referring to a validity term corresponding to a pair of the user name and the password recorded in the storage system; and
    a third step of permitting access by the user to a file corresponding to the validity term based on a result of the second step,
    wherein the second step includes searching a file system, whose creation time is within the validity term, from among file systems recorded in the storage system, and
    wherein the third step includes permitting the user to access a file in the file system.

12. The authentication method according to claim 11, wherein the second step includes searching a file system, whose creation time is within the validity term and is latest, from among the file systems recorded in the storage system.

13. The authentication method according to claim 11, wherein the first step includes receiving a first time the user, and
    wherein the second step includes searching a file system, whose creation time is within the validity term and is the first time, from among the file systems recorded in the storage system.

14. The authentication method according to claim 11, wherein the third step includes referring to a creation time of each file recorded in the file and permitting the user to access a file whose creation time is within the validity term.

* * * * *